(12) United States Patent
Guner et al.

(10) Patent No.: US 8,108,431 B1
(45) Date of Patent: Jan. 31, 2012

(54) TWO-DIMENSIONAL DATA STORAGE SYSTEM

(75) Inventors: Mahmut Guner, San Jose, CA (US); David Rosenblitt, Mountain View, CA (US)

(73) Assignee: Autotelika, Incorporated, Mountain View, CA (US)

( * ) Notice: Subject to any disclaimer, the term of this patent is extended or adjusted under 35 U.S.C. 154(b) by 581 days.

(21) Appl. No.: 12/053,713

(22) Filed: Mar. 24, 2008

(51) Int. Cl.
*G06F 17/30* (2006.01)
(52) U.S. Cl. .......................................... 707/792; 707/803
(58) Field of Classification Search .................. 707/792, 707/803
See application file for complete search history.

(56) References Cited

U.S. PATENT DOCUMENTS

| | | | | |
|---|---|---|---|---|
| 6,115,704 | A * | 9/2000 | Olson et al. ........................... | 1/1 |
| 6,601,192 | B1 * | 7/2003 | Bowman-Amuah ............ | 714/38 |
| 6,606,626 | B1 * | 8/2003 | Ponnekanti ............................ | 1/1 |
| 2003/0055832 | A1 * | 3/2003 | Roccaforte ................... | 707/100 |
| 2004/0215626 | A1 * | 10/2004 | Colossi et al. ................ | 707/100 |
| 2006/0022048 | A1 * | 2/2006 | Johnson ..................... | 235/462.1 |
| 2006/0069696 | A1 * | 3/2006 | Becker et al. ................. | 707/102 |
| 2006/0235834 | A1 * | 10/2006 | Blakeley et al. .................. | 707/4 |
| 2007/0239691 | A1 * | 10/2007 | Ordonez et al. .................. | 707/3 |
| 2008/0189258 | A1 * | 8/2008 | Miejer et al. ...................... | 707/4 |

OTHER PUBLICATIONS

Codd, E.F. (Jun. 1970) "A Relational Model of Data for Large Shared Data Banks". Communications of the ACM 13 (6): pp. 377-387.
Date, C. J. (2003) Introduction to Database Systems, 8th edition, Addison-Wesley, ISBN 0-321-19784-4.
Chamberlin, Donald D.; Boyce, Raymond F. (1974), "SEQUEL: A Structured English Query Language", Proceedings of the 1974 ACM SIGFIDET (now SIGMOD) Workshop on Data Description, Access and Control, Ann Arbor, MI: pp. 249-264.

* cited by examiner

*Primary Examiner* — Son T Hoang

(57) ABSTRACT

A method providing a level of indirection that abstracts the details of physical data storage, requiring neither indexing nor contiguity of data elements in physical storage for efficient data access. Tables are organized in a diagonal pattern (with a natural implementation in electronic spreadsheets), where the region occupied by each table is expandable and shrinkable. A novel query processing mechanism applies successive expressions in a query to progressively smaller arrays of references to a table's records. A novel method for implementing join operations avoids data replication, where the table derived from the join contains a matrix of references to values in the original tables. The derived table can subsequently be used to update the original tables via references, where this capability can be utilized in a user interface supporting atomic data entry transactions, where users may edit the derived table, and the corresponding original tables are atomically updated.

10 Claims, 14 Drawing Sheets

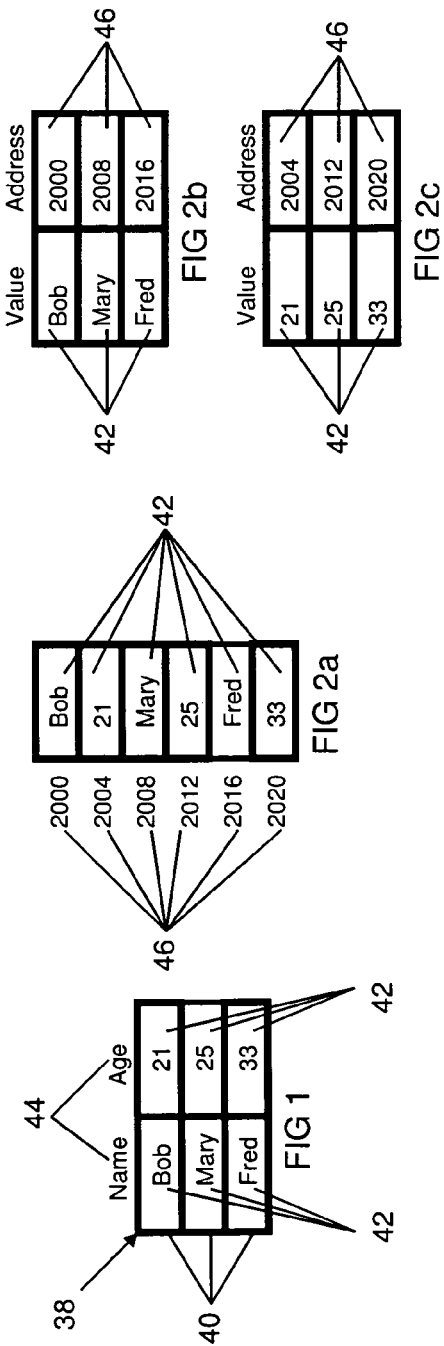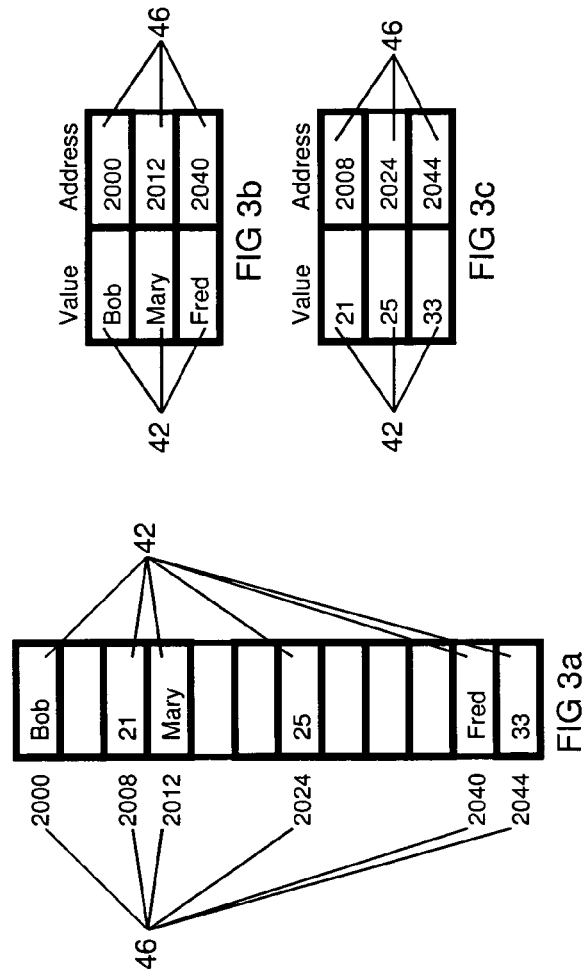

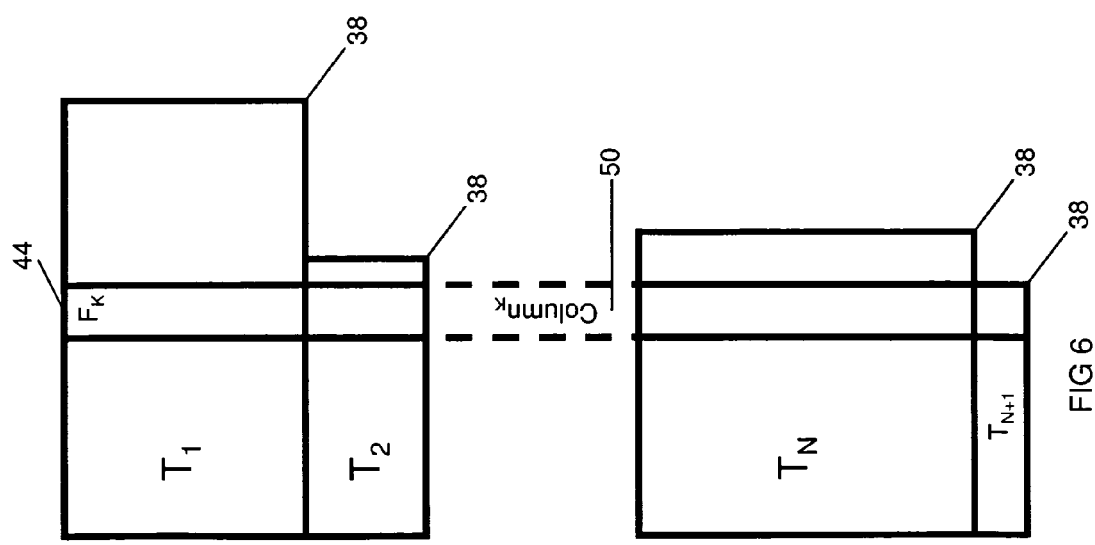

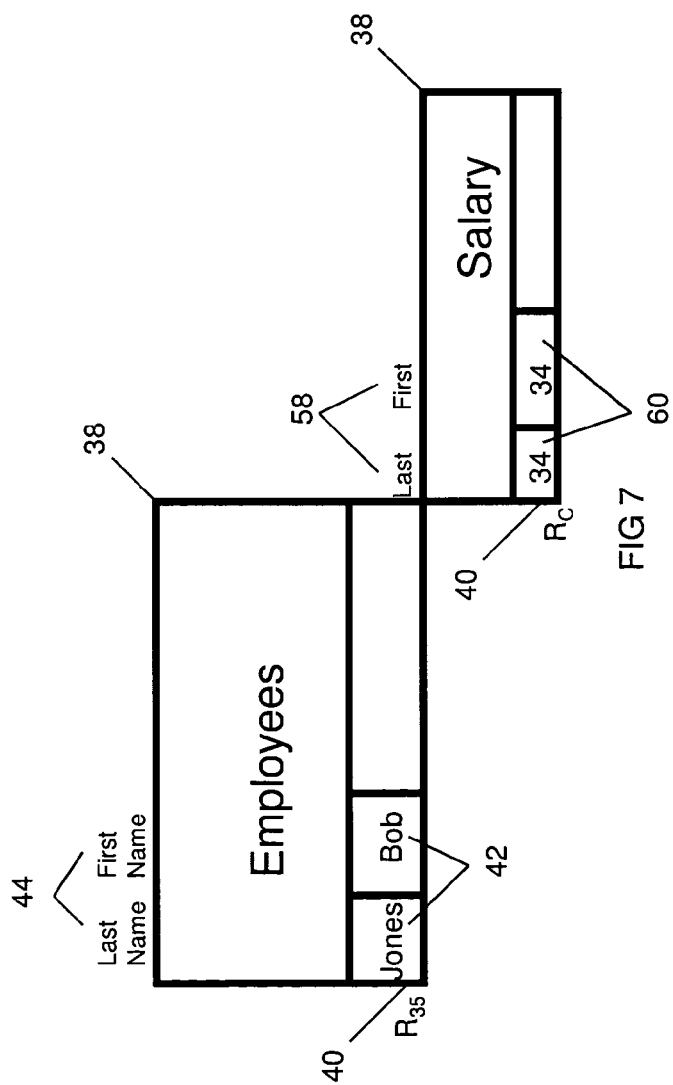
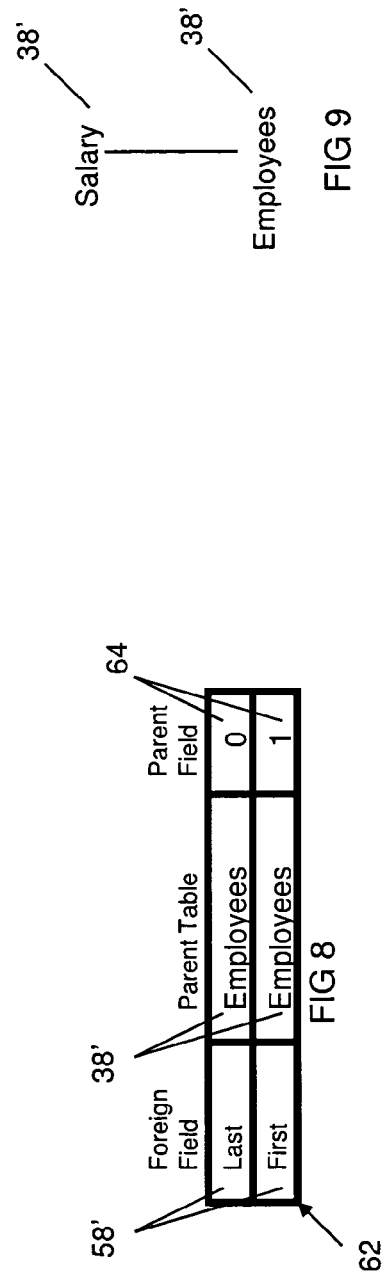

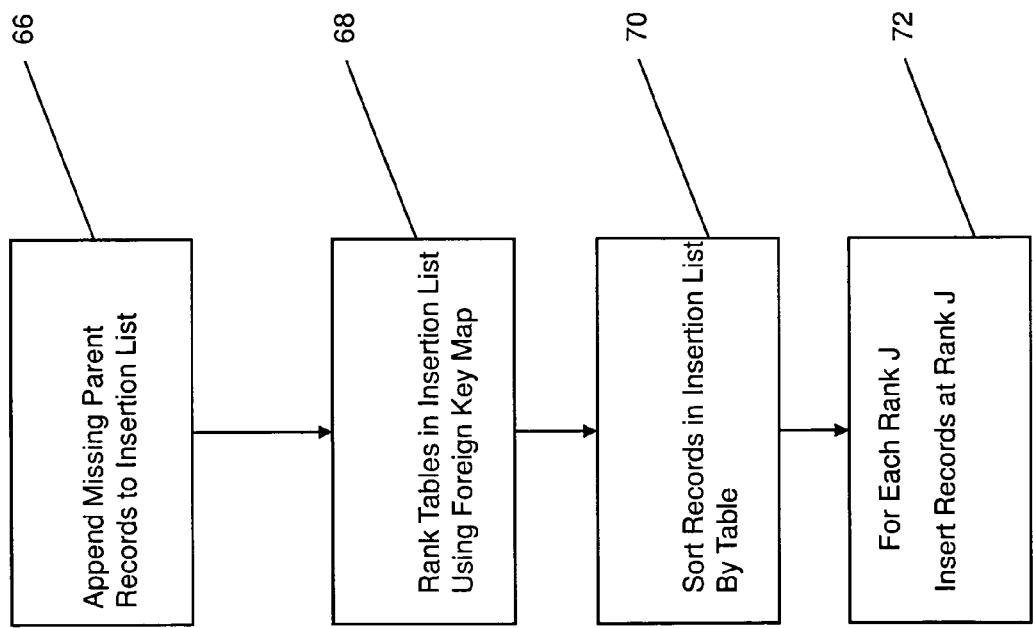

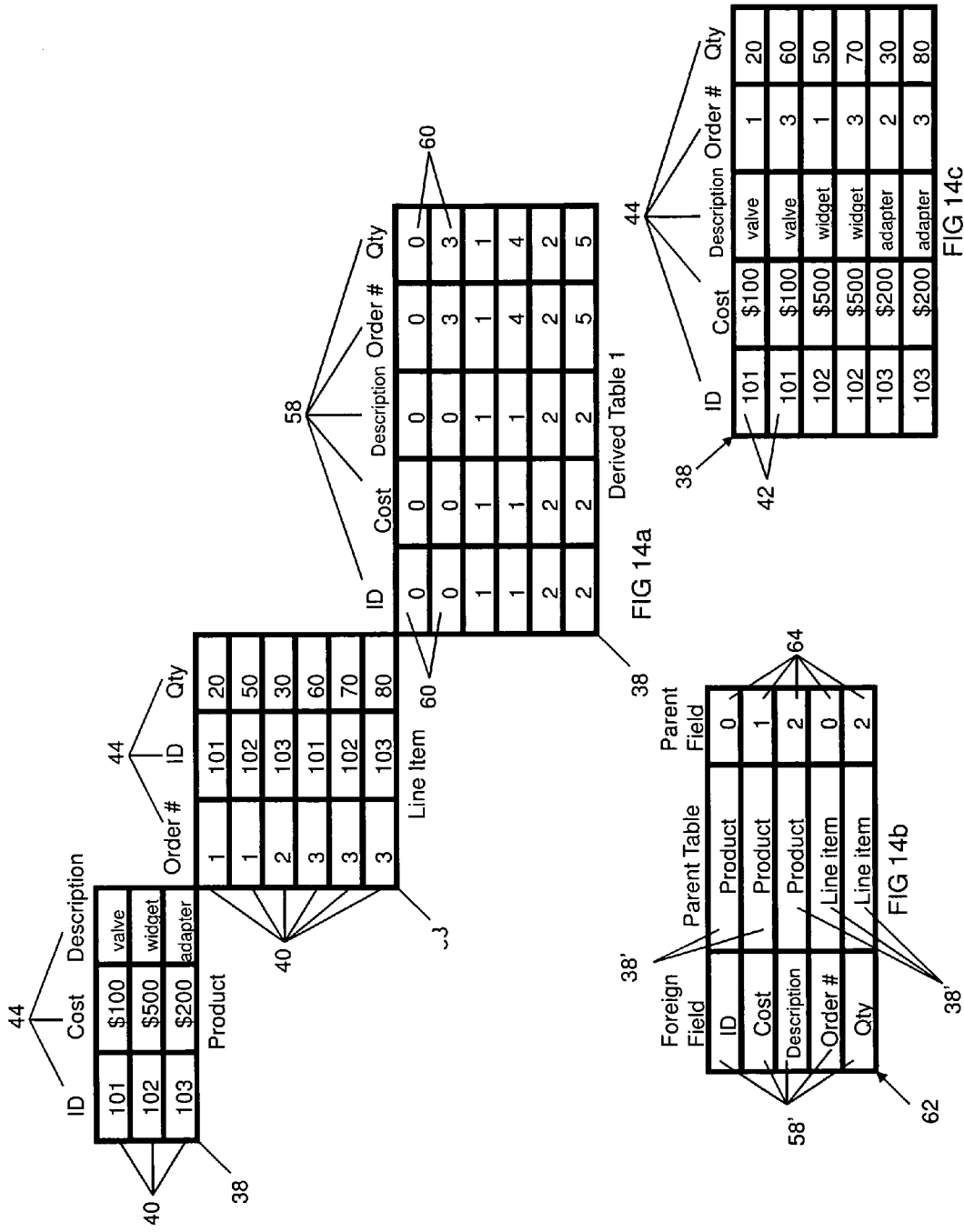

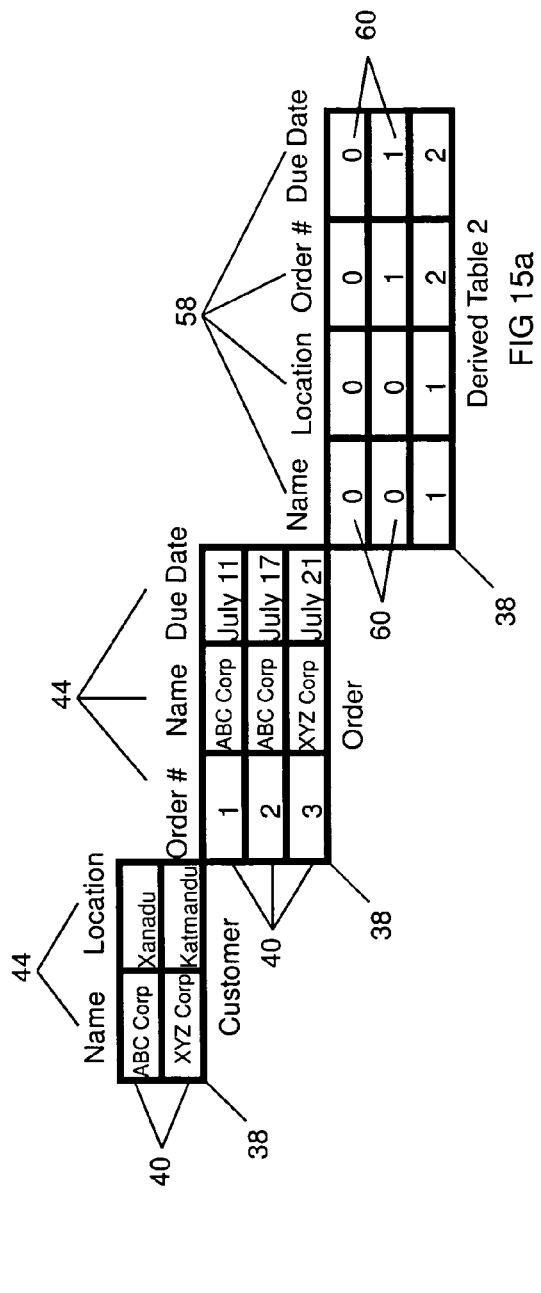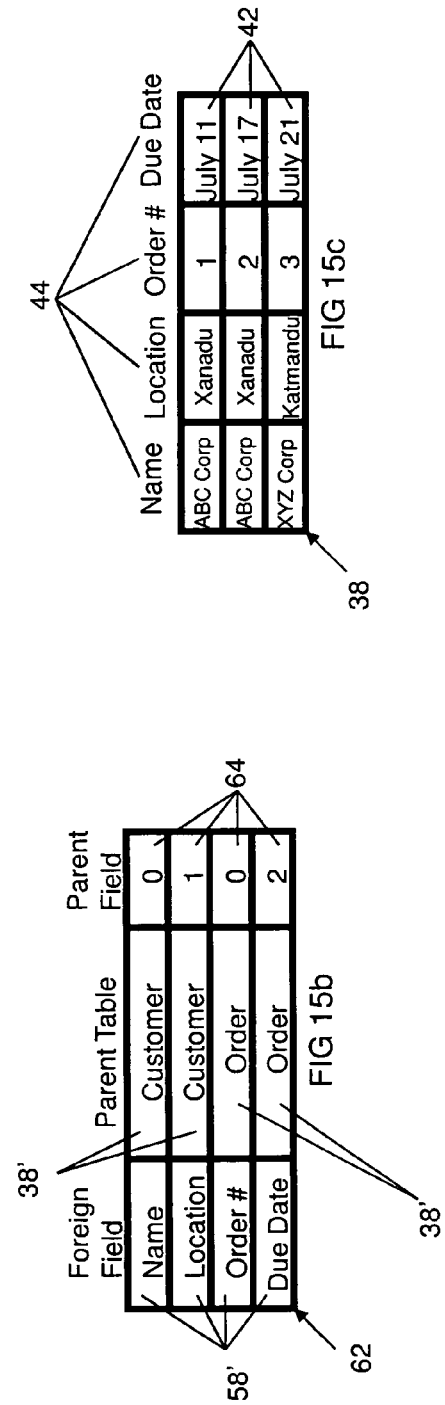

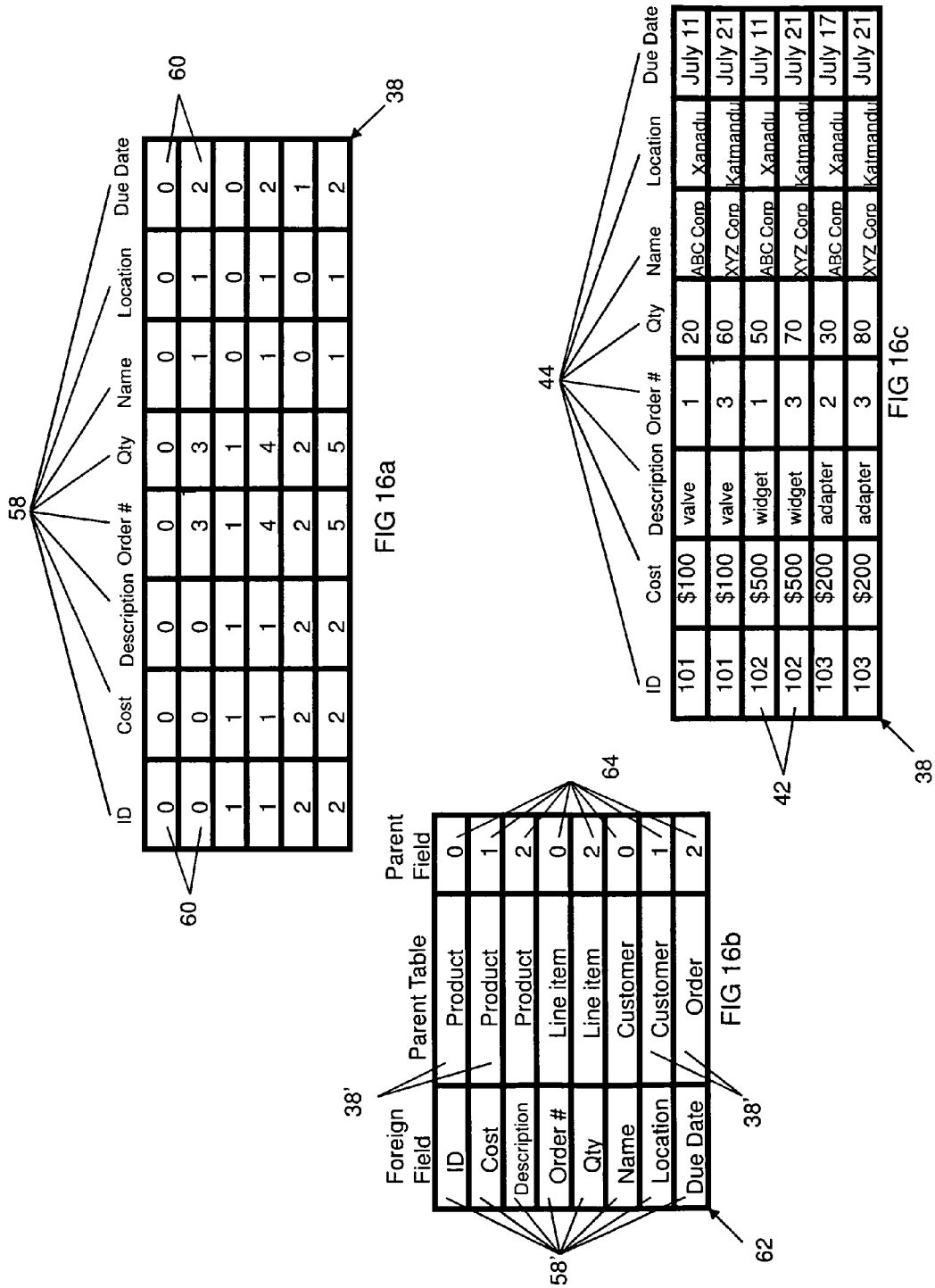

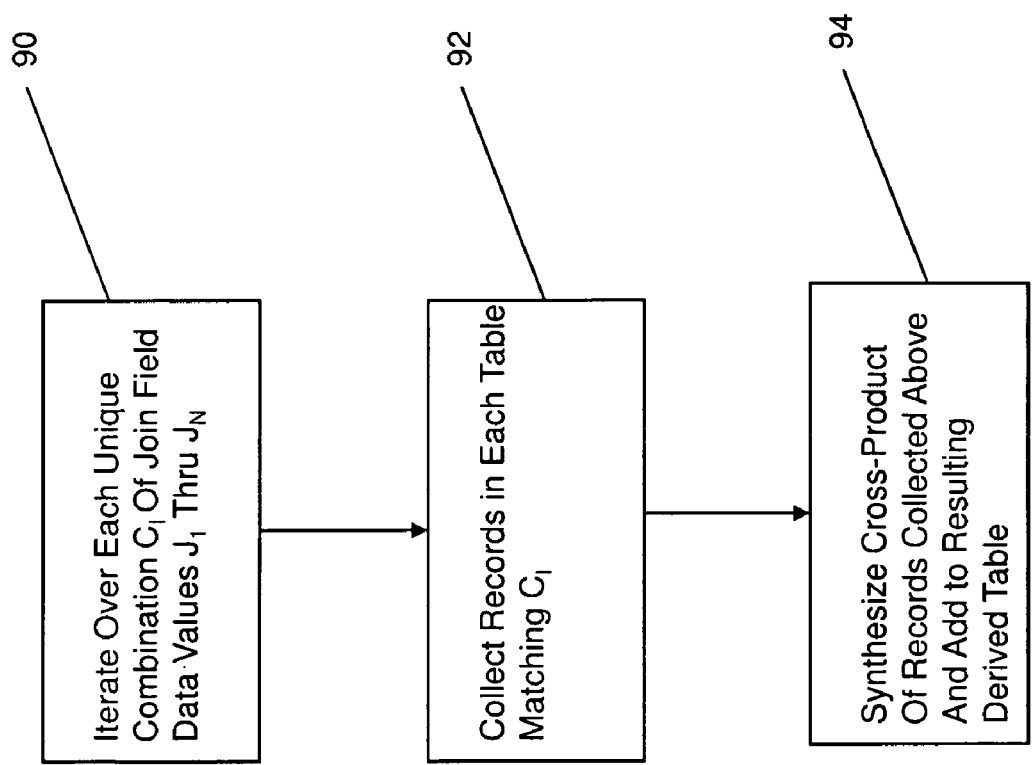

TWO-DIMENSIONAL DATA STORAGE SYSTEM

BACKGROUND OF THE INVENTION

1. Field of the Invention

Data storage systems, database management systems and associated user interfaces.

2. The Prior Art

One-Dimensional Model of Data Storage

The implementation of any system for storing, accessing and manipulating data, such as a database system, must store data in memory relative to some model of data storage. Data storage is typically modeled as one-dimensional, since memory itself is accessed via one-dimensional addresses (that is, the address of a memory location is a single integer). This includes relational data storage systems, which store data organized as tables 38 containing a series of records 40, where each record 40 contains data values 42 corresponding to a series of fields 44, as illustrated in FIG. 1, which shows a simple table 38. FIG. 2a illustrates how data values 42 may be contiguously stored, relative to a one-dimensional data storage model, where each data value 42 is stored at a distinct memory location identified by a one-dimensional address 46. Even though a relational database table 38 is logically viewed as two-dimensional, containing a matrix of data values 42 organized into fields 44 and records 40, it is typically implemented using contiguous one-dimensional data storage. Such relational data storage systems are based on the relational data model introduced by Codd, E. F. (June 1970) "A Relational Model of Data for Large Shared Data Banks". Communications of the ACM 13 (6): 377-387 and elaborated by Date, C. J. (2003) Introduction to Database Systems, 8th edition, Addison-Wesley, ISBN 0-321-19784-4.

For example, FIG. 1 shows a simple table 38 containing three records 40 each containing data values 42 corresponding two fields 44. FIG. 2a illustrates how data values 42 may be contiguously stored, relative to a one-dimensional data storage model, where each data value 42 is stored at a distinct memory location identified by a one-dimensional address 46. In contrast, FIG. 3a illustrates how these data values 42 may be stored non-contiguously (where the storage of other data values 42 may be interleaved with the six data values 42 shown in the table 38 in FIG. 1).

Data Accessed Via Indexes Containing Physical Addresses

Data typically is accessed via indexes. An index is essentially a lookup table that maps the data values 42 corresponding to a field 44 (or a combination of fields 44) to the addresses 46 of those data values 42, as illustrated in FIGS. 2b and 2c, which show indexes for fields 44 Name and Age (see the table 38 shown in FIG. 1), respectively. FIGS. 3b and 3c show similar indexes for data values 42 stored noncontiguously, as illustrated in FIG. 3a. Using indexes to lookup data values 42 is far more efficient than performing a full table scan by sequentially searching a table's records 40. Indexes are typically implemented as a variant of b-trees (or some other data structure that organizes a set of values to facilitate rapid search).

Accessing data via indexes suffers from a fundamental limitation: data values 42 are accessed via their physical addresses 46, resulting in the following drawbacks:

Index Addresses May Require Adjustment: the address 46 contained in the index must be updated if data values 42 are relocated—since accessing data values 42 via indexes requires that accurate physical addresses 46 be contained in the index.

Replicated Data May Require Index Adjustment: since indexes replicate data values 42, indexes must be adjusted when these data values 42 are modified in order to keep the index consistent with the latest modifications to these data values 42.

Data Contiguity Is Required to Support Bulk Data Access Capability: for performance reasons, the succession of data values 42 within a record 40 is typically stored contiguously in physical storage to facilitate retrieval of a record 40 in a single operation. Similarly, records 40 within a table 38 are typically stored contiguously in physical storage to facilitate "bulk" sequential access to the records 40 comprising a table 38. Such bulk sequential access methods enable large amounts of data values 42 to be obtained in a single (or few) data access operations. This de facto data contiguity requirement means that data cannot be relocated (unless the entire table is relocated, such that contiguity is preserved) without undermining the hulk access capability.

Fixed-Size Memory Regions and Fragmentation: a new table 38 is allocated a contiguous, fixed-size region, which may result in fragmentation if this region is underutilized (if the table is sparsely populated).

"Flat" Data With No Intrinsic Meaning: Data values 42 have no intrinsic meaning (other than their values), and a table schema is required to interpret/relate data values 42 in a context. For example, a series of data values 42 may comprise a record 40 in a table but this is only evident in the context of the table's schema—nothing intrinsic to the data values 42 themselves indicate membership in the record 40. Similarly, nothing intrinsic to data values 42 themselves indicates that a set of data values 42 all correspond to the same field 44. The schema functions as the lens through which data values 42 can be "related".

Queries and Joins

Two key capabilities of relational databases are executing a query on a table 38 and joining tables 38 on a common field 44 (or fields 44) to generate a new table 38 containing data values 42 copied from the original tables 38. Various relational querying mechanisms have been developed, such as the popular SQL (Chamberlin, Donald D.; Boyce, Raymond F. (1974), "SEQUEL: A Structured English Query Language", Proceedings of the 1974 ACM SIGFIDET Workshop on Data Description, Access and Control: pp. 249-264). Joining tables 38 is typically a computationally expensive operation, and many strategies for optimizing join operations have been developed.

Table Reconfiguration

It is not uncommon for the structure, or schema of a table 38 to change after its initial definition. Time-consuming reconfiguration is often required when fields 44 are inserted into or deleted from a table 38, primarily due to the need to maintain contiguity. This typically involves exporting the data values 42 of the modified tables 38 (often as ASCII files with separators), converting from the old table schema to the new schema, and then loading the exported data values 42 relative to the new schema. With conventional data storage systems, contiguity of successive data values 42 within a record 40 is often required, which may necessitate re-assigning the locations of all data values 42 contained in the modified tables. This re-assignment of locations would of course not be required if data were permitted to be stored noncontiguously (as illustrated in FIG. 3a).

Spreadsheets and Databases

In the prior art, when a spreadsheet application requires database functionality, it must interact with a separate database application. This has the following drawbacks:

data must be communicated between the spreadsheet application and database application, possibly resulting in processing delays since the representation of data inter-relationships is contained within the database application, the spreadsheet application itself (and associated user interface) cannot exploit knowledge of these data inter-relationships

ADVANTAGES

Logical Data Access Independent of the Details of Physical Storage

The present invention provides a method for implementing a two-dimensional data storage system, where data values 42 are accessed "logically", that is, independently of the details of how physical data storage is actually organized—and independently of physical data addresses 46. (In contrast, with conventional systems, access to data values 42 is typically mediated via indexes containing physical addresses 46.) For example, this permits data values 42 to be:

stored noncontiguously in physical storage relocated in physical storage without impacting logical addresses Efficient Data Access Whereas in conventional systems, data values 42 are typically accessed via index lookups of a data value 42 (or a series of data values 42 corresponding to a series of fields 44), in the two-dimensional logical storage space data may be accessed via a novel query processing algorithm whose performance is comparable to that of an index-based lookup (without incurring the overhead required to maintain indexes).

In the two-dimensional logical storage space, retrieving a record 40 (or set of data values 42 corresponding to a field 44) can be a simple data access operation requiring no search, even if data values 42 are stored noncontiguously. Efficient bulk data access to a collection of records 40 in a table 38 can be performed by accessing a specific region in the two-dimensional space. In addition, the two-dimensional space facilitates field-level locking, where the data values 42 corresponding to a specific field 44 can be locked, and record-level locking, where the data values 42 corresponding to a specific record 40 can be locked.

No Table Reconfiguration Required

The present invention avoids the need to reconfigure tables 38 when records 40 or fields 44 are inserted into or deleted from a table 38. Reconfiguration can be avoided because contiguity in physical data storage is not required, as successive data values 42 in the logical two-dimensional model can be mapped to noncontiguous locations in physical data storage (the logical two-dimensional model can also be implemented in a spreadsheet, which also does not require reconfiguration as fields 44 and records 40 are inserted or deleted).

Queries and Joins

A novel query processing mechanism is provided, where successive expressions in a query are applied to progressively smaller arrays of references to a table's records 40. A novel method of implementing relational join operations is also provided, where the table 38 derived from the join operation contains references (which may be implemented as integer offsets) to data values 42 in the original "base" tables 38, thereby avoiding copying any data values 42 in the "base" tables 38. The derived table 38 is space-efficient, since it stores references to data values 42, rather than the actual data values 42 themselves. Whereas in conventional databases, the result of a join operation is typically used only as a report—in contrast, in the present invention, tables 38 derived from join computations can also be used to drive data entry. This capability can be used as part of a user interface that supports atomic data entry transactions, where users can edit data in the derived table 38, and the appropriate updates are atomically propagated back to the original base tables 38.

Implementation of a Relational Database in a Spreadsheet

The two-dimensional logical data storage space may be implemented via an electronic spreadsheet, such as Microsoft Excel. Therefore it is not necessary to interface the spreadsheet with a separate database system. In addition, the spreadsheet would also have access to, and be able to exploit knowledge about the representation of data inter-relationships contained within the database (for example, the spreadsheet application's user interface could display visual linkages among the data).

Further objects and advantages will become apparent from a consideration of the drawings and ensuing description.

SUMMARY OF THE INVENTION

A method for implementing a logical two-dimensional data storage model is disclosed, providing a level of indirection that abstracts from the details of physical data storage. An arbitrarily large number of tables 38 can be placed within the two-dimensional data storage space. The preferred organization of tables 38 is via a diagonal pattern, illustrated in FIG. 4, where the region occupied by each table 38 is formed by the intersection of a set of rows 48 and columns 50 unique to each table 38. The region occupied by each table 38 is expandable and shrinkable (as rows 48 and columns 50 are added to or deleted from the two-dimensional data storage space). The logical two-dimensional data storage model has a natural implementation in conventional electronic spreadsheet applications (such as Microsoft Excel).

Organizing data values 42 into records 40 and fields 44 is the essence of relational, tabular data. The two-dimensional logical model provides intrinsic meaning to data values 42 (independent of a table schema), in the sense that (under the diagonal pattern):

the collection of data values 42 in a row 48 in the two-dimensional logical storage space correspond to a single record 40 the collection of data values 42 in a column 50 in the two-dimensional logical storage space correspond to a single field 44

Thus, retrieving the set of data values 42 corresponding to a record 40 or field 44 is a simple data access operation requiring no search. Efficient bulk data access to a collection of records 40 in a table 38 can be performed by accessing a region in the two-dimensional space hounded by specific rows 48 and columns 50.

The two-dimensional logical storage space can be used to support the basic database operations for inserting or deleting a table 38, and inserting, updating or deleting a field 44 or record 40. When tables 38. fields 44 and records 40 are inserted or deleted, the positional coordinates of any preceding tables 38 within the two-dimensional space may require adjustment to compensate for the presence or absence of the inserted or deleted table 38, field 44 or record 40.

We also disclose a novel query processing mechanism, where successive expressions in a query are applied to progressively smaller arrays of references to the table's 38 records 40. This query processing mechanism may also be used for data access. This query processing algorithm is efficient because evaluating each query's expression has comparable performance to an index-based lookup (without an indexing overhead), and successive expressions in the query typically operate on a small number of records 40. Only the first query expression is evaluated relative to the entire table's 38 records 40.

We also disclose a novel method for implementing relational join operations, where the table 38 derived from the join operation contains a matrix of references (which may be implemented as integer offsets) to data values 42 in the original base tables 38—which avoids copying any data values 42 from the original base tables 38. The preferred implementation of the join algorithm uses the aforementioned query processing mechanism to identify matching records 40 relative to a specific series of data values 42 in join fields 44.

Tables 38 derived from join computations can be used to drive data entry (for example, via a forms-based user interface). This capability can be used as part of a user interface supporting "atomic" data entry, where users can edit data in the derived table 38, and the appropriate updates are atomically propagated hack to the base tables 38 (where these updates would be atomic in the sense that either all of the base tables 38 corresponding to the modified derived table 38 are updated, or none of these base tables 38 are updated). Atomic data entry transactions can be determined by analyzing a join graph representing the sequence of join operations which generated the derived table 38.

The two-dimensional logical storage model avoids the need for reconfiguring tables 38 when records 40 or fields 44 are inserted into or deleted from a table 38. Reconfiguration can be avoided because contiguity in physical data storage is not required, as successive data values 42 in the logical two-dimensional model can be mapped to noncontiguous locations in physical data storage (the logical two-dimensional model can also be implemented in a spreadsheet, which also does not require reconfiguration as fields 44 and records 40 are inserted or deleted).

Since the two-dimensional logical storage model enables implementation of a relational database via an electronic spreadsheet, such as Microsoft Excel, it is not necessary to interface the spreadsheet with a separate database system. In addition, the spreadsheet would also have access to and be able to exploit knowledge about the representation of data inter-relationships contained within the database. For example, the spreadsheet application's user interface can display visual linkages among the data.

BRIEF DESCRIPTION OF THE DRAWINGS

FIG. 1 illustrates a simple table.

FIG. 2*a* illustrates how a table's data values may be stored contiguously in one-dimensional storage.

FIGS. 2*b* and 2*c* illustrate indexes for a table's fields (for contiguously stored data values).

FIG. 3*a* illustrates how a table's data values may be stored noncontiguously in one-dimensional storage.

FIGS. 3*b* and 3*c* illustrate indexes for a table's fields (for noncontiguously stored data values).

FIG. 6 illustrates how tables may be stored via a vertical pattern in the two-dimensional storage space.

FIG. 7 illustrates 2 tables linked in a parent-child relationship via foreign fields.

FIG. 8 illustrates a Foreign Field Map.

FIG. 9 illustrates a Foreign Key Map.

FIG. 10 illustrates a flowchart for the bulk insertion algorithm.

FIGS. 14*a* thru 14*c* and 15*a* thru 15*c* illustrate the joining of two base tables, the resulting derived table and Foreign Field Map.

FIGS. 16*a* thru 16*c* illustrates the joining of two derived tables, the resulting derived table and Foreign Field Map.

FIG. 18 is a flowchart for the join algorithm.

DETAILED DESCRIPTION OF THE INVENTION

A Two-Dimensional Data Storage Model

Figure 4:
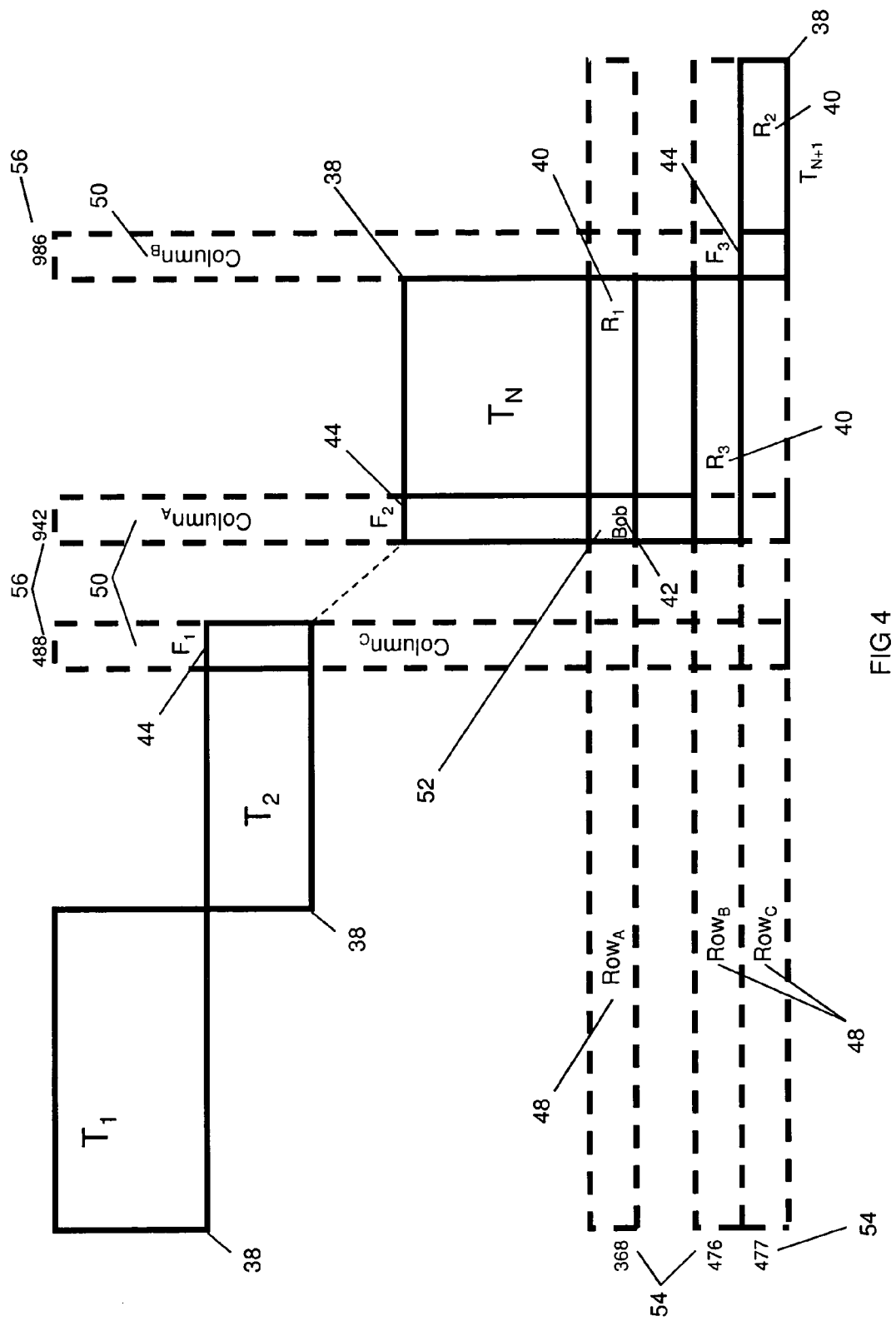
FIG. 4 illustrates how tables may be stored via a diagonal pattern in the two-dimensional storage space and how tables, fields and records may be inserted and deleted.

FIG. 4 illustrates the main elements of our two-dimensional logical data storage model:

Cell 52: contains a single data value 42.

Row 48: contains cells 52 whose data values 42 comprise a series of records 40

Column 50: contains cells 52 whose data values 42 comprise a series of fields 44

The rows 48, columns 50 and cells 52 in the two-dimensional logical storage space may be thought of as "containers" for records 40, fields 44 and data values 42, respectively.

Two-Dimensional Addresses

Locations in the two-dimensional space are expressed in terms of coordinates along two axes, a column axis and a row axis (analogous to x and y Cartesian axes). As shown in FIG. 4:

the position of a row 48 in the two-dimensional space is expressed in terms of its row coordinate 54. For example, in FIG. 4, the row coordinate 54 for $Row_A$ is 368.

the position of a column 50 is expressed in terms of its column coordinate 56. For example, in FIG. 4, the column coordinate 56 for $Column_A$ is 942.

the position of a cell 52 is expressed in terms of its row coordinate 54 and column coordinate 56. For example, in FIG. 4, the cell 52 containing the data value 42 "Bob" located at the intersection of $Row_A$ and $Column_A$ has the two-dimensional address (368, 942), where its row coordinate 54 is 368 and its column coordinate 56 is 942.

We note that it may be useful to partition the two-dimensional storage space into a collection of "sheets", where each row coordinate 54 and column coordinate 56 would also specify the coordinate of its containing sheet.

A row's 48 row coordinate 54 will be incremented (or decremented) when a new row 48 is inserted (or an existing row 48 is deleted) at a position prior to that row coordinate 54. Similarly, a column's 50 column coordinate 56 will be incremented (or decremented) when a new column 50 is inserted (or an existing column 50 is deleted) at a position prior to that column coordinate 56.

Populating the Two-Dimensional Space With Tables

Figure 5:
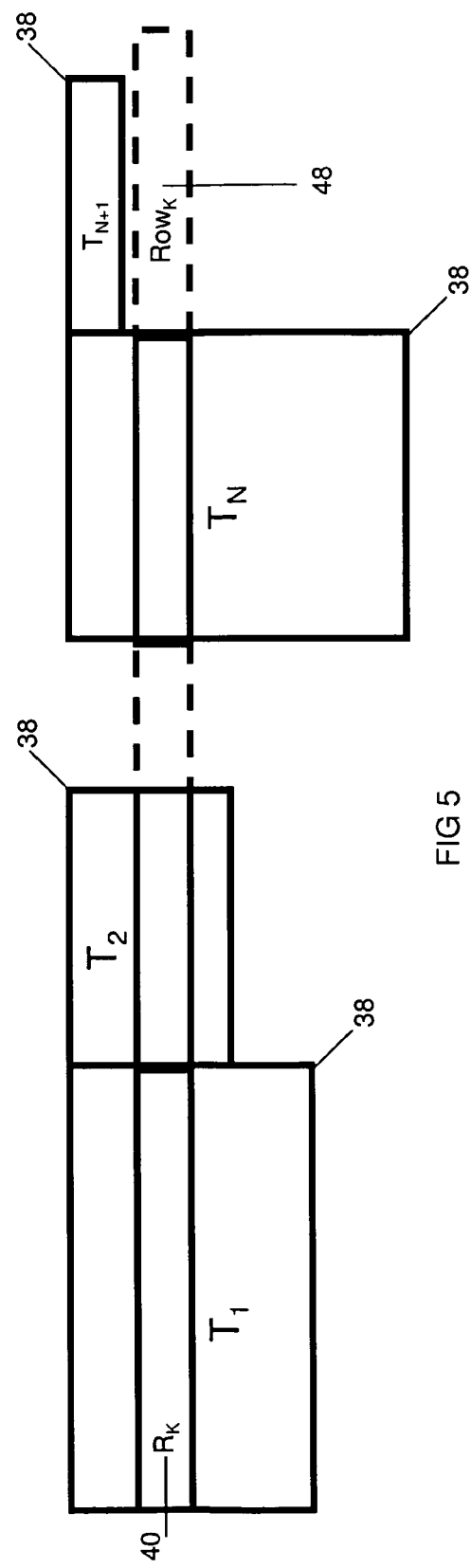
FIG. 5 illustrates how tables may be stored via a horizontal pattern in the two-dimensional storage space.

There is more than one way to place tables 38 within the two-dimensional storage space. If tables 38 are placed into the two-dimensional space in an arbitrary fashion, a row 48 in the two-dimensional space may contain records 40 from multiple tables 38 and a column 50 in the two-dimensional space may contain fields 44 from multiple tables 38. Alternatively, tables 38 may be stored according to a horizontal pattern, as illustrated in FIG. 5, where each row 48 in the two-dimensional storage space may contain records 40 from multiple tables 38, but each column 50 contains a single field 44 from a single table 38. And a vertical pattern is illustrated in FIG. 6, where each column 50 may contain fields 44 from multiple tables 38 but each row 48 contains a single record 40 from a single table 38. (The vertical pattern might be difficult to implement via conventional electronic spreadsheets, which typically require that each column 50 spans all rows 48, making it impossible to "stack" tables 38 with different fields 44 in a vertical pattern within a single spreadsheet, as illustrated in FIG. 6.)

The Diagonal Pattern

Our preferred method of placing tables 38 within the two-dimensional storage space is to store tables 38 in rectangular regions arranged in a diagonal (or "staircase") pattern, as illustrated in FIG. 4. The diagonal pattern combines the advantages of the horizontal pattern (each column 50 contains a single field 44) and vertical pattern (each row 48 contains a single record 40). For example, in FIG. 4, $Row_A$ contains a single record 40 $R_1$ from table 38 $T_N$, and $Column_A$ contains a single field 44 $F_2$ in table 38 $T_N$.

The diagonal pattern (unlike the horizontal and vertical patterns) preserves table 38 compactness and prevents changes to one table 38 from affecting other tables 38. Each row 48 and each column 50 in the two-dimensional storage space corresponds to a unique table 38, so expanding or shrinking a table 38 by inserting or deleting rows 48 or columns 50, does not create gaps formed by the presence of empty rows 48 or columns 50 (see below). Thus, changes to one table 38 can be isolated from the other tables 38. For example, with the diagonal pattern, the entire row 48 in the two-dimensional storage space can be removed when deleting the record 40 contained by that row 48, and the entire column 50 can be removed when deleting the field 44 contained by that column without creating gaps in any other table 38. Similarly, inserting a record 40 (by inserting a new row 48 to contain that new record 40) or field 44 (by inserting a new column 50 to contain that new field 44) in the diagonal pattern does not create gaps in other tables 38. In contrast, with the horizontal pattern, deleting a record 40 R may create gaps in the two-dimensional space, since other records 40 belonging to other tables 38 may also be present in the same row 48 in which R resides—preventing the deletion of that row 48. That is, the record 40 R would be deleted, but its containing row 48 must remain so that it can still contain records 40 in other tables 38. For example, in FIG. 5 a horizontal gap will remain in table 38 $T_1$ if the record 40 $R_K$ in $Row_K$ is deleted from table 38 $T_1$, since it is not possible to delete the entire $Row_K$, since $Row_K$ contains records 40 in tables 38 $T_2$ and $T_N$ (and possibly other tables 38 between $T_2$ and $T_N$). Similarly, inserting a record 40 (for example, inserting a record 40 toward the beginning of a table 38) may create gaps in other tables 38, since a new row 48 would need to be added to the two-dimensional space to contain that new record 40 (assuming that a suitable gap to contain that new record 40 did not already exist)—and that new row 48 will contain empty records 40 (and hence gaps) in the other tables 38 spanned by that new row 48. For example, in FIG. 5, assume that $Row_K$ represents a new row 48 that was just added to the two-dimensional space to contain a new record 40 $R_K$ to be inserted into table 38 $T_1$. Therefore, $Row_K$ will contain empty records 40 (and hence gaps) where it spans tables 38 $T_2$ and $T_N$ (and possibly other tables 38 between $T_1$ and $T_N$). Similarly, with the vertical pattern, deleting a field 44 F may create gaps in the two-dimensional space, since other fields 44 belonging to other tables 38 may still be present in the same column 50 in which F resides—preventing the deletion of that column 50. For example, in FIG. 6 a vertical gap will remain in table 38 $T_1$ if the field 44 $F_K$ in $Column_K$ is deleted from table 38 $T_1$, since it is not possible to delete the entire $Column_K$ from the two-dimensional space, since $Column_K$ also contains fields 44 in tables 38 $T_2$ and $T_N$ (and possibly other tables 38 between $T_2$ and $T_N$). Similarly, inserting a field 44 may create gaps in other tables 38, since a new column 50 must be added to the two-dimensional space to contain that new field 44 (assuming that a suitable gap to contain that new field 44 did not already exist)—and that new column 50 will contain empty fields 44 (and hence gaps) in the other tables 38 spanned by that new column 50. For example, in FIG. 6, assume that $Column_K$ represents a new column 50 that was just added to the two-dimensional space to contain a new field 44 $F_K$ to be inserted into table 38 $T_1$. Therefore, $Column_K$ will contain empty fields 44 (and hence gaps) where it spans tables 38 $T_2$ and $T_N$ (and possibly other tables 38 between $T_1$ and $T_N$).

In the following sections, we will assume that the diagonal pattern is used to store tables 38 in the two-dimensional storage space.

Implementing the Logical Two-Dimensional Data Storage Model in Physical Storage

Some scheme is required to map from two-dimensional logical data storage to physical data storage. Note that it is not necessary for this mapping to map successive logical data cells 52 to contiguous memory addresses 46 in physical data storage. One method is simply to use an electronic spreadsheet, such as Microsoft Excel, which provides a natural, flexible two-dimensional physical infrastructure that can be used to directly implement the two-dimensional logical data storage space.

Any such mapping scheme (which would likely be based on arrays) should automatically adjust row coordinates 54 and column coordinates 56 when rows 48 and columns 50 are inserted or deleted. Note that successive cells 52 may contain variable-sized data values 42 (since integers, reals, strings, etc. may have different sizes). If fixed-size regions are allocated to tables 38, it may be necessary to handle potential overflows if a table 38 expands beyond its original region, and underflows, if a table 38 shrinks to a certain size (in order to avoid fragmentation and wasted space).

Expandable and Shrinkable Regions vs. Fixed Regions

Table 38 regions may be expandable/shrinkable or fixed, depending on how the two-dimensional data storage space is implemented. Regions will be expandable/shrinkable if an electronic spreadsheet, such as Excel, is used, since spreadsheets permit arbitrary insertion (up to certain very large limits) and subsequent deletion of rows 48 and columns 50. For example, FIG. 4 illustrates the expansion of table 38 $T_N$'s region via insertion of a row 48 $Row_B$ to contain a new record 40 $R_3$ and the expansion of table 38 $T_2$'s region via the addition of a new column 50 $Column_C$ to contain a new field 44 $F_1$ (similarly, these table 38 regions can also shrink via the deletion of rows 48 and columns 50). If some alternate implementation of the two-dimensional logical data storage space is used, it might be the case that table 38 region dimensions are initially fixed, necessitating a strategy for dealing with potential row 48 and/or column 50 overflows and underflows. For example, if a table 38 outgrows its allocated region (through the insertion of rows 48 and/or columns 50), then it could be moved into a larger region. Or alternatively, the overflowing table 38 could remain in its original region, and can continue its growth in a second region. In addition, when table 38 dimensions are fixed, it may be useful to develop strategies for preventing, eliminating or reducing gaps that may arise when rows 48 and/or columns 50 (or tables 38 themselves) are deleted.

We will assume that table 38 regions are expandable and shrinkable in the following sections.

Relational Schema and Query Language

To illustrate the use of the two-dimensional relational data storage model, we outline a simple relational schema. Of course, any relational schema consistent with the conventional relational data model can be used relative to the two-dimensional data storage model. The schema described below is provided solely for illustrative purposes.

Table Definition/Schema

Relational tables 38 are defined relative to a schema according to the relational data model described in Codd (Codd, E. F. (June 1970) "A Relational Model of Data for Large Shared Data Banks", Communications of the ACM 13 (6): 377-387) and elsewhere. Our relational schema defines the following information for each table 38 (additional information could be stored as well, but the following consists of a minimal collection of information relative to the conventional relational data model):

specifications for each field 44, indicating field type, size and other details, such maximum/minimum value, default value, etc.

foreign key constraints (where a series of fields 44 in the table's foreign key correspond to the key fields 44 in a "parent" table 38)

uniqueness constraints (indicating a collection of fields 44 whose combination of corresponding data values 42 must be unique)

(optional) a primary key, consisting of one or more fields 44, such that each record 40 in the table 38 has a unique primary key value if necessary, a Foreign Field Map 62 (discussed below) to indicate the parent field(s) 44 corresponding to any foreign field(s) 58. A Foreign Field Map 62 should be present if the table 38 was formed as the result of a join operation (see later section on Relational Joins and Derived Tables), to map each foreign field 58 in the table 38 derived from the join operation to a specific parent field 44 in a base table 38 (where a base table 38 is a table 38 that does not result from a join operation).

If a spreadsheet is used in the implementation of the two-dimensional logical storage space, the spreadsheet itself must be augmented with a programming language to represent the schema and perform various database operations, such as query processing and join operations (for example, Microsoft Excel has access to various programming languages in the Windows programming environment).

Table Position

The following additional information (stored in the table 38 schema) represents the position of each table 38 within the two-dimensional storage space:

column coordinate 56 for the column 50 containing the table's first field 44 (for example, in FIG. 4, the column coordinate 56 for table 38 $T_N$ is 942, the column coordinate 56 for COLUMN$_A$, which contains $T_N$'s first field 44 $F_2$.

row coordinate 54 for the row 48 containing the table's first record 40

Including the table's column coordinate 56 in the schema involves a tradeoff—since a table's column coordinate 56 will require adjustment when a preceding table 38 in the two-dimensional space has a field 44 added or deleted, or a table 38 itself is inserted or deleted prior to the current table 38. Similarly, a table's row coordinate 54 must be adjusted if a table 38 at a prior position within the two-dimensional space has a record 40 inserted or deleted, or a table 38 itself (containing at least one record 40) is inserted or deleted prior to the current table 38. A table 38 at a prior position within the two-dimensional space is any table 38 with a lower column coordinate 56 or row coordinate 54 (for example, in HG 4, $T_N$ precedes $T_{N+1}$).

Determining Row and Column Coordinates For Fields and Records

However, it may be useful to store each table's 38 column coordinate 56 and row coordinate 54 in order to avoid recomputing these values each time they are needed.

The column coordinate 56 for a field 44 can be found by adding the field's 44 offset within the table 38 to the table's column coordinate 56. The table 38 schema indicates the order in which fields 44 occur within the table 38, and therefore each field's 44 offset within the table 38 (for example, the first field 44 in a table 38 has offset zero, the second field 44 has offset 1, etc.). Similarly, the row coordinate 54 for a record 40 may be found be adding the record's 40 offset within the table 38 (for example, an offset used in a table 38 derived from a join operation, as discussed in the section Relational Joins and Derived Tables) to the table's row coordinate 54.

Bulk Data Access

Row coordinates 54 and column coordinates 56 are also useful where bulk data access is required where a large chunk of data can be bounded by a row coordinate 54 and column coordinate 56. When dealing with large amounts of data, performance can be improved by loading such chunks of data into memory for speedier processing (for example, see later section on Join Performance Optimization).

Foreign Fields

A foreign field 58 F in table 38 T references a "parent" field 44 G in another table 38 U, in which case the foreign field specification for F (in the schema for table 38 T) must indicate G, as well as G's containing table 38 U. For example, in FIG. 7, the Salary table 38 contains two foreign fields 58, "Last" and "First", which refer to parent fields 44 in the Employees table 38, "Last Name" and "First Name", respectively. Each foreign field data value 60 refers to a specific data value 42 in the parent field 44 in the parent table 38. In FIG. 7, foreign field data values 60 are represented as integer offsets (instead of copying the actual data values 42 from the parent record 40) representing the position of the corresponding parent record 40 within the parent table 38. For example, in FIG. 7 the record 40 shown in the Salary table 38 contains two foreign field data values 60, both with the value 34, indicating that the $35^{th}$ record 40 (since the first record 40 has an offset of zero) in the parent table 38 contains the corresponding parent field data values 42, "Jones" and "Bob" (corresponding to the "Last" and "First" foreign fields 58, respectively). The row coordinate 54 for the row 48 containing this parent record 40 can be computed by adding this offset (the foreign field data value 60) to the parent table's row coordinate 54.

Note that a table 38 may contain multiple foreign fields 58 (where each foreign field 58 is mapped to its corresponding parent field 44 via the table's Foreign Field Map 62 as discussed below).

Note that it is possible to specify the parent table 38 by its "table number", or an integer indicating the relative position of the parent table 38 within the two-dimensional space. For example, if the Employees table 38 is the $6^{th}$ table 38 in the two-dimensional space, its table number would be 5 (assuming the first table 38 has a table number of zero).

One advantage to having foreign field data values 60 specify parent records 40 via references (such as pointers or integer offsets) is that space can be saved, since the references are smaller than the corresponding data values 42. Another advantage is avoiding replication of the data values 42 in the parent record 40. This approach can also be useful in scenarios where data entry is driven from tables 38 derived from join operations, where a user interface permits data entry into such derived tables 38, and where updates to these derived tables 38 are propagated back to the original base tables 38, as discussed in the later section on Data Entry Forms and Atomic Transactions.

Foreign Field Data Value Adjustments

However, a disadvantage to having foreign field data values 60 specify parent records 40 via integer offsets is that the offsets may require adjustment when records 40 are inserted or deleted in the parent table 38—if the inserted or deleted record 40 resides at a position prior to the referenced parent record 40. For example, in FIG. 7, the $35^{th}$ record 40 would become the $34^{th}$ record 40 if a parent record 40 is deleted above, or would become the $36^{th}$ record 40 when a parent record 40 is inserted above. Therefore, we recommend that integer offsets be used to represent foreign field data values 60 only in tables 38 derived from join operations (discussed in the later section Mapping Foreign Fields), or any other tables 38 that are likely to be transient tables 38 and therefore unlikely to require subsequent adjustment (due to subsequent insertion or deletion of records 40 in the parent table 38) during their limited lifespan. As discussed in the later section on Data Entry Forms and Atomic Transactions, one reason for enabling foreign field data values 60 to reference records 40 in the parent table 38 is to support atomic data entry into complex tables 38, such as tables 38 derived from join operations (where these derived tables 38 contain references to records 40 in the parent tables 38 containing the actual data values 42).

Foreign Field Maps

FIG. 8 shows a Foreign Field Map 62 for the Salary table 38, where the parent field value 64 is specified as an integer offset. For example, the two entries in FIG. 8 specify that:

the foreign fieldname 58' "Last" corresponds to the first parent field 44 "Last Name" in the Employees table 38, as indicated by the corresponding parent field value 64, which contains the integer offset 0 (where the first field 44 has offset 0)

the foreign fieldname 58' "First" corresponds to the second parent field 44 "First Name" in the Employees table 38, as indicated by the corresponding parent field value 64, which contains the integer offset 1

Note that in FIG. 8, the reference numeral 38' indicates a tablename (whereas the reference numeral 38 indicates a table), and the reference numeral 58' indicates a foreign fieldname (whereas the reference numeral 58 indicates a foreign field).

Note that when accessing a record 40 R in a table 38 containing foreign fields 58, it will be necessary to convert the foreign field data values 60 contained in R (if these foreign field data values 60 are implemented as references, such as integer offsets) into their corresponding data values 42 contained in the referenced record 40 in the parent table 38, by utilizing the Foreign Field Map 62 for the table 38 containing R.

The column coordinate 56 within two-dimensional space for the column 50 containing a referenced parent field 44 can be computed by adding the aforementioned parent field value (offset) 64 to the parent table's column coordinate 56 (which is the column coordinate 56 for the column 50 containing the first field 44 in the parent table 38—see previous section on Table Position).

As mentioned previously, the row coordinate 54 within two-dimensional space for the row 48 containing a referenced parent record 40 can be computed by adding the aforementioned foreign field data value (offset) 60 to the parent table's row coordinate 54 (which is the row coordinate 54 for the row 48 containing the first record 40 in the parent table 38—see previous section on Table Position).

Foreign Field Map Adjustments

Parent field values 64 that are implemented as integer offsets that refer to a parent field 44 in a parent table 38 may require adjustment when fields 44 are inserted or deleted in that parent table 38—if the inserted or deleted field 44 resides at a position prior to the referenced parent field 44. For example, in FIG. 7, the $2^{nd}$ field 44 "First Name" in the Employees table 38 (the parent table 38 of the Salary table 38) would become the $3^{rd}$ field 44 if a new field 44 is inserted at the beginning of the Employees table 38—in which case the parent field value 64 in FIG. 8 corresponding to the "First" foreign field 58 would need to be incremented (since the "First" foreign field 58 the Salary table 38 refers to the "First Name" field 44 in the Employees table 38).

To illustrate the usage of the two-dimensional logical storage space, in the following sections we describe how some common database operations can be implemented.

Adding Tables to the Two-Dimensional Storage Space

Initially, the two-dimensional space contains a single row 48 and a single column 50 (and therefore a single cell 52). When a new table 38 is inserted into the two-dimensional space, a series of columns 50 is added to contain the fields 44 of the table 38. The column coordinate 56 for the new table 38 will be the column coordinate 56 of the preceding table 38 plus the number of columns 50 occupied by the preceding table 38. (The column coordinate 56 will be 2 for the first table 38 to be inserted into the two-dimensional space, since the first column 50 is reserved for locking information, as discussed in the later section on Locking.) Similarly, the row coordinate 54 for the new table 38 will be the row coordinate 54 of the preceding table 38 plus the number of rows 48 occupied by the preceding table 38, (The row coordinate 54 will be 2 for the first table 38 to be inserted into the two-dimensional space, since the first row 48 is reserved for locking information, as discussed in the later section on Locking.)

Inserting the new table 38 to the right of all existing tables 38 has the advantage of not requiring any adjustment to the column coordinate 56 associated with any existing table 38. Of course, the new table 38 can be inserted anywhere in the two-dimensional space—where the column coordinates 56 for tables 38 following the newly inserted table 38 within the two-dimensional space must be incremented by the number of columns 50 occupied by the new table 38. Similarly, if the newly inserted table 38 contains any records 40, then the row coordinates 54 for tables 38 following the newly inserted table 38 must be incremented by the number of rows 48 occupied by the new table 38. FIG. 4 illustrates the insertion of a new table 38—assume that $T_N$ 38 is the current rightmost table 38 in the two-dimensional space, and a new table 38 $T_{N-0}$ is then placed immediately to the right of $T_N$. In FIG. 4, Column, contains the first field 44 $F_2$ of $T_N$ and Column$_B$ contains the first field 44 $F_3$ of the new table 38 $T_{N+1}$. The column coordinate 56 of $T_{N+1}$ will be equal to the column coordinate 56 of $T_N$ plus the number of columns 50 occupied by $T_N$.

If gaps have arisen in the two-dimensional space (for example, gaps might arise in some implementations when tables 38 are deleted), it may instead be desirable to add a new table 38 within a sufficiently large gap, by using an algorithm to identify a sufficiently large unused block of columns 50.

(However, if a spreadsheet is used to implement the two-dimensional data storage space, gaps should not arise.)

Inserting a Record into a Table

A new record 40 can be inserted into a table 38 by inserting a new row 48 to contain the new record 40. For example, in FIG. 4, a new record 40 $R_3$ is inserted into a table 38 $T_N$ by inserting a new row 48 $Row_B$ to contain $R_3$, where $Row_B$ is placed after the current last row 48 in $T_N$. The row coordinate 54 for the last row 48 in $T_N$ can be determined by obtaining the row coordinate 54 of the following table 38 $T_{N+1}$ and then performing an "insert row" operation at that row coordinate 54—where the newly inserted row 48 $Row_B$ will contain the new last record 40 $R_1$ in $T_N$. The next table 38 $T_{N0}$ can be located by identifying the table 38 with the smallest row coordinate 54 (or column coordinate 56) that exceeds the row coordinate 54 (or column coordinate 56) of $T_N$. (If there is no table 38 following $T_N$, then the row coordinate 54 at the end of the $T_N$ can be determined by adding the number of rows 48 contained in $T_N$ to s row coordinate 54.) The new row 48 $Row_B$ can then be populated with the appropriate data values 42 (where the data values 42 should be written atomically, such that if writing any individual data value 42 fails, the entire insert operation fails).

One advantage of this approach is that conventional spreadsheet applications (such as Excel) already provide an "insert row" function that inserts a new row 48 immediately above a selected row 48. An alternative method for adding a new row 48 to $T_N$ is to insert the new row 48 before the first row 48 in $T_N$ (where the first row 48 in any table 38 resides at the table's row coordinate 54).

Since query processing performance improves when records 40 are sorted, in the preferred embodiment, once a table 38 reaches a certain size (a certain number of records 40), its records 40 are sorted (ideally by their primary key data values 42). A one-time "global" sort on the table's records 40 could be triggered when this size is reached. After this size is reached, each new record 40 to be inserted is then placed in the appropriate sorted position within the table 38. That is, adding each new record 40 causes an "incremental" sort of the new record 40 within the table 38. Prior to the table 38 reaching that limit, each new record 40 may simply be appended to the end (or alternatively, prepended to the beginning) of the table 38.

When a record 40 is inserted into a table 38, and there are foreign fields 58 that reference that table 38, then these foreign field references may require adjustment, especially if these references are implemented as integer offsets. For example, FIG. 7 shows that the Salary table 38 contains foreign field data values 60 (implemented as the integer offset "34") referring to $R_{35}$ (the 35th record 40 in the Employees table 38). If a new record 40 is inserted into the Employees table 38 above $R_{35}$, then $R_{35}$ will then become the $36^{th}$ record 40 in the Employees table 38, and the corresponding foreign field data value 60 should be incremented to account for the presence of the just-inserted record 40.

Any record 40 may be updated simply by updating its corresponding data values 42.

Cascading Insertion of Records

If a newly inserted child record 40 C refers to a record 40 P in a parent table 38, but P does not exist, then a default record 40 P can be created and inserted (providing appropriate default data values 42 for any of P's other fields 44 not directly referenced by C), before inserting C, if "cascading insertion" is enabled. Otherwise, if cascading insertion is not enabled, then the insertion of C will fail due to the violation of the foreign field constraint. For example, in FIG. 7, if during the process of inserting record 40 $R_C$ into the Salary table 38, it was discovered that $R_C$'s parent record 40 $R_{35}$ in the Employees table 38 did not exist, $R_{35}$ could be created and inserted into the Employees table 38, and then the child record 40 $R_C$ could be inserted into the Salary table 38 without violating the Salary table's foreign field constraint. Insertions may continue to cascade if $R_{35}$ refers to a grandparent record 40 G that does not exist, etc. (Cascading insertion may be most useful when importing records 40 from another database, where newly imported records 40 may refer to parent records 40 that do not yet exist in the current database.)

As mentioned previously, if references, especially integer offsets, are used in the implementation of foreign field data values 60 (to indicate the relative position of the referenced parent record 40 within the parent table 38, as discussed earlier), and such offsets reference records 40 following a just-inserted record 40 then these offsets should be incremented to account for the presence of the new record 40. As an optimization, incrementing these offsets may be batched. That is, instead of performing offset increments each time a record 40 is inserted, the offset increments can be deferred until a series of insertions are performed. Thus, instead of incrementing an offset multiple times, the offset would be increased just once. For example, if 3 records 40 were inserted above a given record 40 R and a child record 40 contains an offset in a foreign field data value 60 referring to R, then that offset would be increased just once—by 3. To accomplish this, it would be useful to maintain a log of the inserted records 40 (and their offsets within their containing table 38)—so that it can be determined whether an inserted record 40 was above or below the record 40 referred to by the foreign field data value 60.

Foreign Key Maps

A Foreign Key Map represents parent-child relationships among tables 38. FIG. 9 shows a simple Foreign Key Map corresponding to the Employees and Salary tables 38 shown in FIG. 7. The Foreign Key Map can be used to determine the order in which records 40 are inserted when loading data into multiple tables 38 (where parent records 40 must be inserted before child records 40 that refer to parent records 40), and also to determine the order in which records 40 are deleted when deleting data from multiple tables 38 (where child records 40 must be deleted prior to deleting parent records 40), as discussed later.

Bulk Insertion of Records

The following bulk insertion algorithm inserts a list of records 40 $R_1$ thru $R_N$ (see flowchart in FIG. 10):

66 Append Missing Parent Records to Insertion List: if cascading insertion is enabled, for each record 40 $R_1$ thru $R_N$ in the insertion list, append any missing parent records 40 to the insertion list. (If cascading insertion is not enabled, missing parent records 40 will cause the insertion operation to fail.)

68 Rank Tables in Insertion List: Consult the Foreign Key Map to rank the tables 38 containing records 40 in the insertion list. Tables 38 that do not have a parent table 38 have rank 0, tables 38 that have parent tables 38 but no grandparent tables 38 have rank 1, tables 38 that have parent and grandparent tables 38 but no great-grandparent tables 38 have rank 2, etc.

70 Sort Insertion List: sort the records 40 in the insertion list by table 38 and remove any duplicate records 40

72 Insert Records into Tables at a Given Rank: For each table rank in succession, starting with rank 0, insert the records 40 in the insertion list belonging to tables 38 of that rank.

Deleting a Record from a Table

A record 40 to be deleted is specified in terms of its primary key value (which may contain multiple data values 42 if the primary key contains multiple fields 44). Then, the actual record 40 to delete can be obtained by performing the query processing function (described in the later section on Query Processing), which should return exactly 1 record 40 if a primary key has been defined for that table 38 (if the table 38 has no primary key, then the record 40 to be deleted must be specified by providing data values 42 for each of its fields 44).

When a record 40 is deleted from a table 38, and there are foreign field references to that table 38, then these foreign field references may require adjustment, especially if these references are implemented as integer offsets. For example, FIG. 7 shows that the Salary table 38 contains foreign field data values 60 (implemented as the integer offset "34") referring to $R_{35}$ (the 35th record 40 in the Employees table 38). If a record 40 residing above $R_{35}$ is deleted from the Employees table 38, then $R_{35}$ will then become the 34 record 40 in the Employees table 38, and the corresponding foreign field data value 60 should be decremented to account for the absence of the just-deleted record 40.

Identifying the Context of a Record

When deleting a record 40 R we must also consider any child records 40 which refer to R via foreign fields 58. The fundamental constraint is that child records 40 must be deleted before their parent records 40, since deleting the parent record 40 first will violate the child's foreign field constraint (since the child will at that point refer to a non-existent, deleted parent record 40). For example, in FIG. 7, the record 40 shown in the (parent) Employees table 38 cannot be deleted until the record 40 shown in the (child) Salary table 38 is deleted. Therefore, if a to-be-deleted record 40 R refers to one or more parent records 40 such parent records 40 cannot be deleted until the (child) record 40 R is deleted. Similarly, if there are any child records 40 referring to R, these child records 40 must be deleted before R is deleted.

Cascading Deletion of Records

If cascading deletion is enabled, then when deleting a record 40 R, R's descendant records 40 are also deleted. For example, when deleting a record 40 R, we cascade the delete to its child records 40, grand-child records 40, etc. Note that if cascading deletion is not enabled, then the delete operation will fail if the to-be-deleted record 40 R has associated child records 40 (since any foreign field constraints in any of R's child records 40 would be violated after the deletion of the corresponding parent record 40 R).

If references (especially integer offsets) are used in the implementation of foreign field data values 60 (to indicate the relative position of the parent record 40 within the parent table 38, as discussed earlier), as an optimization, the adjustment of such references may be batched. That is, instead of performing offset decrements each time a record 40 is deleted, the offset decrements can be deferred until a series of deletes are performed. Thus, instead of decrementing an offset multiple times, the offset would be decreased just once. For example, if 5 records 40 were deleted above a given record 40 R and a child record 40 contains an offset in a foreign field data value 60 referring to R, then that offset would be decreased just once—by 5. To accomplish this, it would be useful to maintain a log of the original offsets for any deleted records 40—so that it is can be determined whether a deleted record 40 was above or below the record 40 referred to by the foreign field data value 60.

If references (especially integer offsets) are used in the implementation of foreign field data values 60 (to indicate the relative position of the parent record 40 within the parent table 38, as discussed earlier), all other modifications to the database should be locked out during the actual recursive deletion (or insertion) process (which could involve modifying several records 40), in order to preserve the integrity of such offsets, which may require adjustment during this recursive deletion process.

Bulk Deletion of Records

The Foreign Key Map, which indicates the parent-child relationships among tables 38, is a useful resource if a collection of records 40 from multiple tables 38 are to be deleted. For example, a table 38 with no child tables 38 can safely be chosen as the first table 38 to have records 40 deleted (that is, without being concerned about violating any foreign field constraints).

Figure 11:
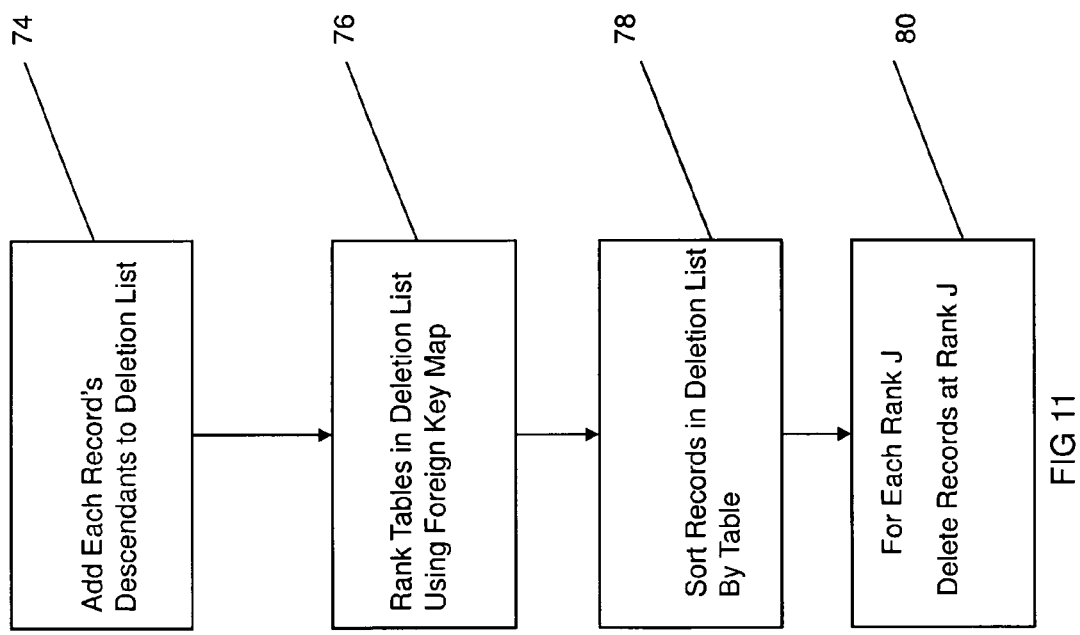
FIG. 11 illustrates a flowchart for the bulk deletion algorithm.

The following algorithm deletes a list of records 40 $R_1$ thru $R_N$ (see flowchart in FIG. 11):

74 Add Descendants to Deletion List: if cascading deletion is enabled, for each record 40 $R_1$ thru $R_N$ in the deletion list, append any child records 40 to the deletion list. (If cascading deletion is not enabled, the presence of child records 40 will cause the deletion operation to fail.)

76 Rank Tables in Deletion List: Consult the Foreign Key Map to rank the tables 38 containing records 40 in the deletion list. Tables 38 with no child tables 38 have rank 0, tables 38 with child tables 38 but no grandchild tables 38 have rank 1, tables 38 with child and grandchild tables 38 but no great-grandchild tables 38 have rank 2, etc.

78 Sort Deletion List: sort the records 40 in the deletion list by table 38 and remove any duplicate records 40

80 Delete Records in Tables at a Given Rank: for each table rank in succession, starting with rank 0, delete the records 40 in the deletion list belonging to tables 38 of that rank.

Adding a Field to, or Deleting a Field from a Table

When a new field 44 is added to a table 38, a default data value 42 for that field 44 should be supplied for any records 40 already contained in that table 38. Also, the column coordinate 56 for any table 38 following that table 38 in the two-dimensional space must be incremented to reflect the presence of this new field 44. For example, in FIG. 4, the column coordinates 56 for any tables 38 to the right of $T_2$ must be incremented if a new field 44 $F_1$ is added to $T_2$. Similarly, if a field 44 is deleted from a table 38, the column coordinate 56 of any table to the right of that table 38 must be decremented to reflect the absence of the deleted field 44.

A field 44 may be updated simply by updating the corresponding field specification in the schema for the table 38 containing that field 44. If any existing data values 42 corresponding to the updated field 44 are inconsistent with this modified field specification, then an error should be signaled.

Note that table reconfiguration is not required when fields 44 are added or deleted (even if these fields 44 are part of the primary key), although some adjustments to the column coordinates 56 of tables 38 following the modified table 38 may be required. We note that parent and child tables 38 of the modified table 38 may also require corresponding addition or deletion or fields 44, which can also be accomplished without requiring table reconfiguration.

If there are child tables 38 containing foreign fields 58 referring to a parent table T 38 containing a newly inserted or deleted field 44 (where the inserted or deleted field 44 occurs before the referenced parent field 44 within T), and offsets are used to indicate the relative position of the parent field 58 within T (as discussed earlier), then such offsets will need to be incremented (if a field 44 was inserted into T) or decremented (if a field 44 was deleted from T) to account for the newly inserted or deleted field 44. As an example, in FIG. 7, if a new field 44 (such as a "Middle Name" field 44) was inserted into the Employees table 38 between the "Last Name" and "First Name" fields 44, then the parent field value 64 in the Foreign Field Map shown in FIG. 8 corresponding to the foreign field 58 called "First" should be incremented to become 2.

Adjusting Table Position

When tables 38, fields 44 or records 40 are inserted or deleted, the position (that is, the row coordinate 54 and column coordinate 56) of any "downstream" table 38 following the insertion or deletion will require adjustment. For example, in FIG. 4, if table 38 $T_2$ is deleted, the column coordinate 56 of any tables 38 to the right of $T_2$ (such as $T_N$ and $T_{N+1}$) would be decremented by the number of fields 44 (or columns 50) formerly contained by $T_2$, and the row coordinate 54 of any tables 38 to the right of $T_2$ would be decremented by the number of records 40 (or rows 48) formerly contained by $T_2$.

Such positional adjustments can either be done immediately after each insertion or deletion, or the adjustments can be deferred until the "downstream" table 38 is actually accessed (where a collection of adjustments can be batched and applied to that table 38 at once). In that case, it may be useful to maintain a log of inserts and deletes (or a series of such logs, one log for each table 38), where each table's 38 schema would refer to a specific point within this log, indicating that the table's 38 position has been updated relative to that point in the log. Deferring these adjustments may be useful in some cases, since some tables 38 might never require a positional adjustment, especially if they are transient tables 38 (such as tables 38 derived from join operations, as discussed later) that might never be accessed again.

Query Processing

Various relational querying mechanisms can be implemented relative to the two-dimensional data storage model, such as an SQL-based mechanism (see Chamberlin, Donald D.; Boyce, Raymond F. (1974), "SEQUEL: A Structured English Query Language", Proceedings of the 1974 ACM SIGFIDET Workshop on Data Description, Access and Control: pp. 249-264). In addition, the two-dimensional data storage model supports a novel query processing mechanism, which can also be used as the primary means for accessing data. Under this approach, each query consists of a series of one or more expressions where each expression filters a table's 38 records 40 based on the value of a Boolean condition on a field 44 (for example, "field, >=expression").

Figure 12:
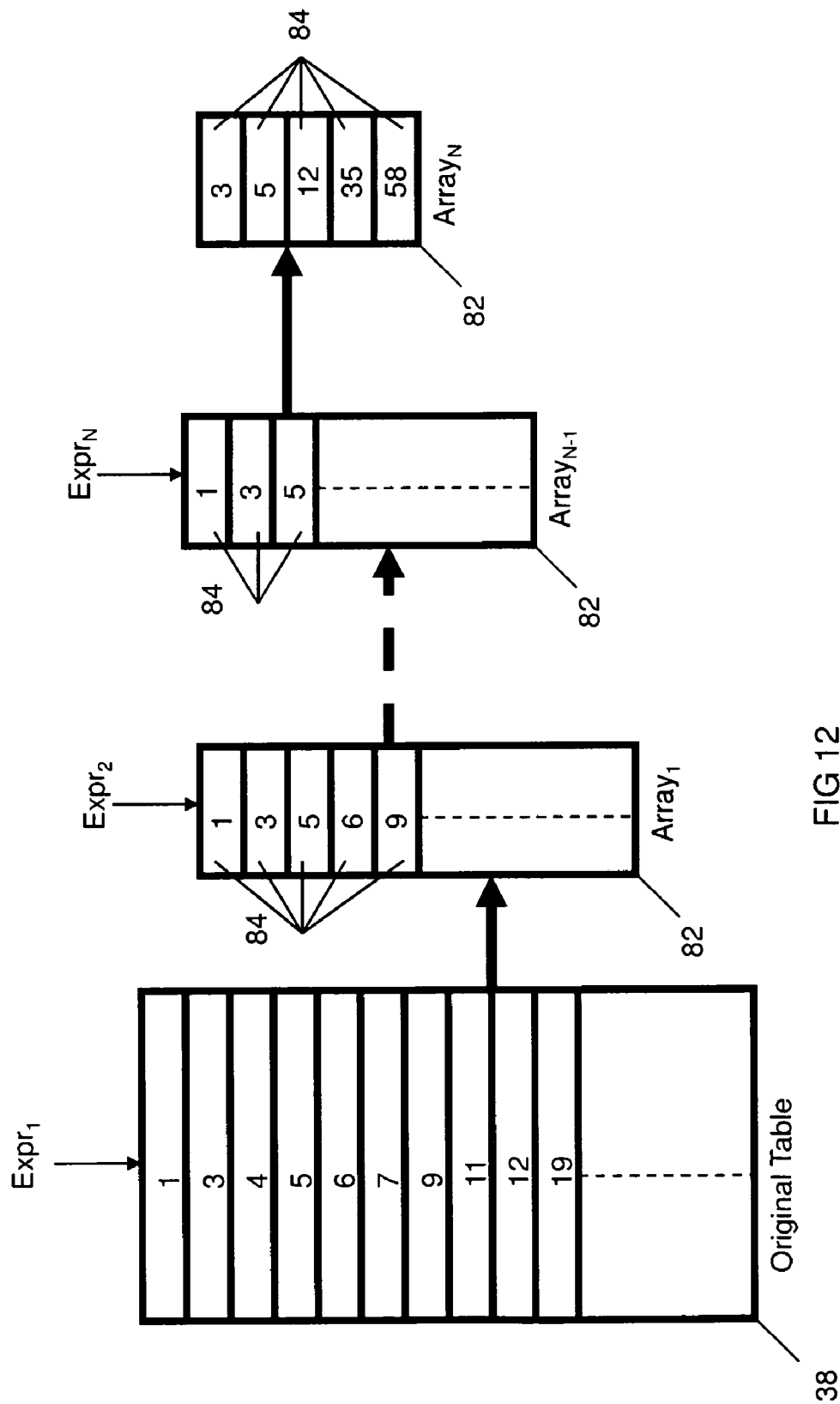
FIG. 12 illustrates the progression of the query execution algorithm on a table.

As illustrated in FIG. 12, query execution proceeds by successively applying expressions, each time producing a (progressively smaller) array 82 containing a series of record offsets 84 referring to records 40 in the original table 38 T (alternatively, pointers could be used instead of integer offsets, but offsets are simple to implement if a spreadsheet is used to implement the two-dimensional storage space). In FIG. 12, processing the first query expression $Expr_1$ results in $Array_1$, which contains a series of record offsets 84 to T's records 40. $Array_1$ then becomes the starting point for applying the next expression $Expr_2$, resulting in a new intermediate result, $Array_2$ (where $Array_2$ contains a subset of the record offsets 84 contained in $Array_1$) This process continues, generating progressively smaller arrays 82, until the final filter expression $Expr_N$ is applied to the intermediate result $Array_{N-1}$, creating the final result, $Array_N$, as illustrated in FIG. 12 (note that the intermediate and final result arrays 82 contain references directly to records 40 in the original table 38 T).

Figure 13:
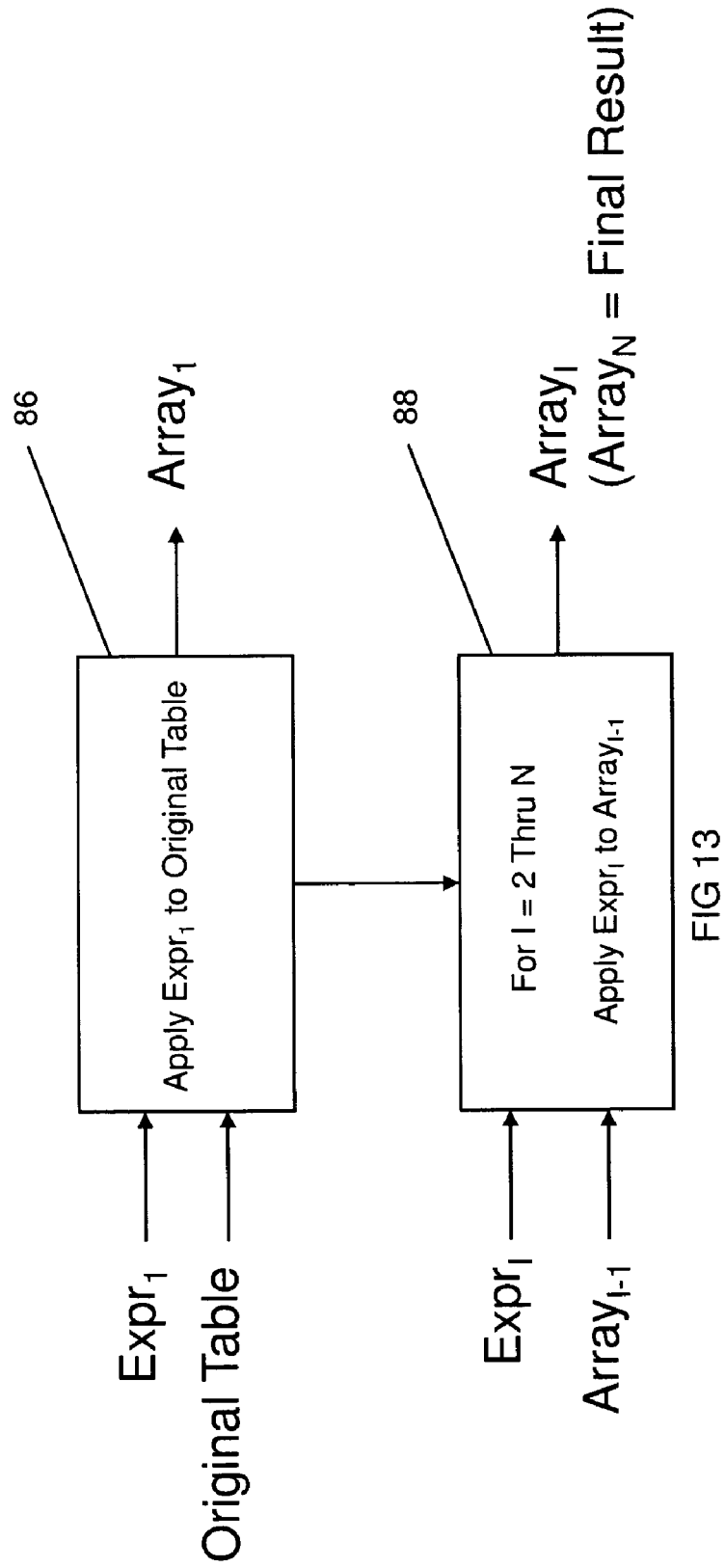
FIG. 13 is a flowchart for the query execution algorithm.

Query processing proceeds according to the following algorithm, where a query consists of filter expressions $Expr_1$ thru $Expr_N$, as illustrated in the flowchart in FIG. 13 (where the execution of this algorithm is illustrated in FIG. 12):

86 Apply filter expression $Expr_1$ to the original table 38 T, generating intermediate result Array, of record offsets 84 into table 38 T's records 40

88 For each query expression $Expr_1$ (as 1 ranges from 2 to N): Apply expression $Expr_1$ to the preceding intermediate result $Array_{1-1}$, generating the next intermediate result $Array_1$. When I=N, we have the final result, $Array_N$.

We note that it is often the case that a query is expected to return a single record 40, assuming a primary key exists for the table 38 to be queried. For example, when updating or deleting a record 40, a query is issued containing a specific primary key value, which should return a single record 40 (or null, if no record 40 containing that primary key value exists for that table 38). Similarly, before inserting a record 40, a query is first issued containing a specific primary key value, which should return null (since the primary key value for the record 40 to be inserted should not yet exist).

As noted earlier, query processing performance improves if records 40 are sorted.

Our query processing algorithm is efficient because evaluating a query expression (especially a query expression that checks for a specific data value 42 in a specified field 44) is roughly comparable to a conventional index-based lookup of a data value 42. We note that only the first expression in the query is generally computed relative to the entire table's 38 records 40 (where subsequent query expressions typically operate on a small number of records 40, as illustrated in FIG. 12).

Relational Joins and Derived Tables

A relational join operation combines records 40 from two tables 38, joining them along a set of common fields 44, resulting in a new (usually temporary) table 38. Each table 38 to be joined is either a base table 38 that did not result from a previous join operation, or a table 38 derived from a previous join operation. A schema (including a Foreign Field Map 62 indicating which foreign fields 58 in the derived table 38 correspond to which parent fields 44 in base tables 38) for the resulting derived table 38 can be generated from the schemas of the tables 38 to be joined. A series of tables 38 may be joined via a series of join operations each joining a pair of tables 38.

The two-dimensional data storage model enables a novel method of implementing join operations, where the table 38 derived from the join operation contains a matrix of references to data values 42 in base tables 38 (where a base table 38 is a table 38 that does not result from a previous join operation). In the spreadsheet implementation of the two-dimensional storage space, each reference may be implemented as foreign field data values 60 referring to specific data values 42 within the appropriate base table 38 (where the derived table's Foreign Field Map 62 indicates the correct field 44 within that record 40, as discussed below). This approach avoids copying any data values 42 from the base tables 38 to the table 38 derived from the join operation. The representation of the derived table 38 is space-efficient, since it stores references to data values 42, rather than actual data values 42 themselves. In addition, the derived table 38 can be used to drive subsequent updates to the corresponding base tables 38. When a derived table 38 is modified (for example, via user interface forms that enable a user to edit derived table 38 contents) these modifications can be propagated back to the appropriate base tables 38 (as discussed in the section Data Entry Forms and Atomic Transactions).

Mapping Foreign Fields

FIG. 14a illustrates the join of two base tables 38, Product and Line Item, on the ID field 44, where the result of the join is Derived Table 1. Note that the join field 44 (the ID field 44 in this case) only needs to appear once in Derived Table 1.

The Foreign Field Map 62 for Derived Table 1 is shown in FIG. 14b, which maps each foreign field 58 in Derived Table 1 to a specific parent field 44 in a base table 38, where each parent field value 64 is specified as an integer offset (as discussed previously in the sections Foreign Fields and Foreign Field Maps). This Foreign Field Map 62 indicates that the first 3 foreign fields 58 correspond to the first 3 fields 44 in the Product table 38, and the final 2 foreign fields 58 correspond to the first and third fields 44 in the Line Item table 38.

FIG. 14a illustrates the foreign field data values 60 in Derived Table 1. When these foreign field data values 60 are accessed, they would be resolved to their corresponding data values 42-FIG. 14c illustrates these equivalent data values 42. FIG. 14c would also be the result if data values 42 from the base tables 38 were copied to the derived table 38 instead of having the derived table 38 store references to the data values 42 in the base tables 38. For example:

- FIG. 14a shows that in the first 2 records 40 in Derived Table 1, the "ID" foreign field 58 contains a foreign field data value 60 of zero, indicating the first record 40 (which has offset zero) in the Product table 38. To resolve this offset to the correct data value 42 within the first record 40 in the Product table 38, we consult the Foreign Field Map 62 in FIG. 14b, which indicates that the ID foreign field 58 corresponds to the first field 44 in the Product table 38 (the ID field 44), whose corresponding data value 42 is "101" (as illustrated in FIG. 14c) in the first record 40.
- FIG. 14a shows that in the first 2 records 40 in Derived Table 1, the "Order #" foreign field 58 contains foreign field data values 60 of zero and 3, respectively, indicating the first and fourth records 40 in the Line Item table 38. To resolve these offsets to the correct data values 42 within the first and fourth records 40 in the Line Item table 38, we consult the Foreign Field Map 62 in FIG. 14b, which indicates that the Order # foreign field 58 corresponds to the first field 44 in the Line Item table 38 (the Order # field 44), whose corresponding data values 42 are "1" and "3" (as shown in FIG. 14c), respectively, in the first and fourth records 40.

Note that if records 40 are inserted or deleted in the parent (base) table 38 referred to by the derived table 38, then the derived table's 38 foreign field data values 60 (offsets) may require adjustment (as discussed in the previous section Foreign Field Data Value Adjustments). Similarly, if fields 44 are inserted or deleted in the parent table 38 referred to by the derived table 38, then the parent field values 64 (field offsets) in the derived table's 38 Foreign Field Map 62 may require adjustment (as discussed in the previous section Foreign Field Map Adjustments). Of course, these adjustments are only required if the derived table 38 continues to have a useful purpose after the result of the join operation is completed.

FIG. 15a illustrates the join of two base tables 38, Customer and Order, on the Name field 44, where the result of the join is Derived Table 2. The Foreign Field Map 62 for Derived Table 2 is shown in FIG. 15b. This Foreign Field Map 62 indicates that the first 2 foreign fields 58 correspond to the 2 fields 44 in the Customer table 38, and the final 2 foreign fields 58 correspond to the first and third fields 44 in the Order table 38.

FIG. 15a illustrates the foreign field data values 60 in Derived Table 2. When these foreign field data values 60 are accessed, they are resolved to their corresponding data values 42—FIG. 15c illustrates these equivalent data values 42. FIG. 15c would also be the result if data values 42 from the base tables 38 were copied to the derived table 38 instead of having the derived table 38 store references to the data values 42 in the base tables 38.

- FIG. 15a shows that in the first 2 records 40 in Derived Table 2, the "Name" foreign field 58 contains a foreign field data value 60 of zero, indicating the first record 40 (with offset zero) in the Customer table 38. To resolve this offset to the correct data value 42 within the first record 40 in the Customer table 38, we consult the Foreign Field Map 62 in FIG. 15b, which indicates that Derived Table 2's Name foreign field 58 corresponds to the first field 44 in the Customer table 38 (the Name field 44), whose corresponding data value 42 is "ABC Corp" (as shown in FIG. 15c) in the first record 40.
- FIG. 15a shows that in the first 2 records 40 in Derived Table 2, the "Due Date" foreign field 58 contains foreign field data values 60 of zero and 1, respectively, indicating the first and second records 40 in the Order table 38. To resolve these offsets to the correct data values 42 within the first and second records 40 in the Order table 38, we consult the Foreign Field Map 62 in FIG. 15b, which indicates that Derived Table 2's Due Date foreign field 58 corresponds to the second field 44 in the Order table 38 (the Due Date field 44), whose corresponding data values 42 are "July 11" and "July 17" (as shown in FIG. 15c), respectively, in the first and second records 40.

FIGS. 14abc and 15abc illustrate the joining of 2 base tables 38 to form Derived Table 1 and Derived Table 2, respectively. Next, instead of joining 2 base tables 38 (tables 38 not resulting from a prior join), FIG. 16a illustrates the result of joining 2 derived tables 38 (Derived Table 1 and Derived Table 2) on the Order # field 44 to form Derived Table 3.

The Foreign Field Map 62 for Derived Table 3 in FIG. 16b indicates that the first 5 foreign fields 58 in Derived Table 3 are from Derived Table 1, and the final 3 foreign fields 58 are from Derived Table 2:
- the first 3 foreign fields 58 correspond to the 3 fields 44 in the Product table 38
- the next 2 foreign fields 58 correspond to the first and third fields 44 in the Line Item table 38
- the next 2 foreign fields 58 correspond to the 2 fields 44 in the Customer table 38
- the final foreign field 58 corresponds to the third field 44 in the Order table 38

Note that the Order # foreign field 58 only needs to appear once in Derived Table 3.

FIG. 16a illustrates the foreign field data values 60 in Derived Table 3. When these foreign field data values 60 are accessed, they are resolved to their corresponding data values 42. FIG. 16c illustrates these equivalent data values 42. FIG. 16c would also be the result if data values 42 from the base tables 38 were copied to Derived Table 3 instead of having Derived Table 3 store references to the data values 42 in the base tables 38.

- FIG. 16a shows that in the first 2 records 40 in Derived Table 3, the "ID" foreign field 58 contains a foreign field data value 60 of zero, indicating the first record 40 (with offset zero) in the Product table 38. To resolve this offset to the correct data value 42 within the first record 40 in the Product table, we consult the Foreign Field Map 62 in FIG. 16b, which indicates that Derived Table 3's ID foreign field 58 corresponds to the first field 44 in the Product table 38 (the ID field 44), whose corresponding data value 42 is "101" (as shown in FIG. 16*c*) in the first record 40.

FIG. 16*a* shows that in the first 2 records 40 in Derived Table 3, the "Order #" foreign field 58 contains foreign field data values 60 of zero and 3, respectively, indicating the first and fourth records 40 in the Line Item table 38. To resolve these offsets to the correct data values 42 within the first and fourth records 40 in the Line Item table 38, we consult the Foreign Field Map 62 in FIG. 16*b*, which indicates that Derived Table 3's Order # foreign field 58 corresponds to the first field 44 in the Line Item table 38 (the Order # field 44), whose corresponding data values 42 are "1" and "3" (as shown in FIG. 16*c*), respectively, in the first and fourth records 40.

FIG. 16*a* shows that in the first 2 records 40 in Derived Table 3, the "Name" foreign field 58 contains foreign field data values 60 of zero and 1, respectively, indicating the first and second records 40 in the Customer table 38. To resolve these offsets to the correct data values 42 within the first and second records 40 in the Customer table 38, we consult the Foreign Field Map 62 in FIG. 16*b*, which indicates that Derived Table 3's Name foreign field 58 corresponds to the first field 44 in the Customer table 38 (the Name field 44), whose corresponding data values 42 are "ABC Corp" and "XYZ Corp" (as shown in FIG. 16*c*), respectively, in the first and second records 40.

FIG. 16*a* shows that in the first 2 records 40 in Derived Table 3, the "Due Date" foreign field 58 contains foreign field data values 60 of zero and 2, respectively, indicating the first and third records 40 in the Order table 38. To resolve these offsets to the correct data values 42 within the first and third records 40 in the Order table 38, we consult the Foreign Field Map 62 in FIG. 16*b*, which indicates that Derived Table 3's Due Date foreign field 58 corresponds to the third field 44 in the Order table 38 (the Order field 44), whose corresponding data values 42 are "July 11" and "July 21" (as shown in FIG. 16*c*), respectively, in the first and third records 40.

Note that in order to improve the readability of FIGS. 14 thru 16, since the focus of these figures is primarily on table 38 contents (rather than their placement within the two-dimensional space) we have omitted the rows 48 and columns 50 containing the records 40 and fields 44.

Join Graphs

Figure 17:
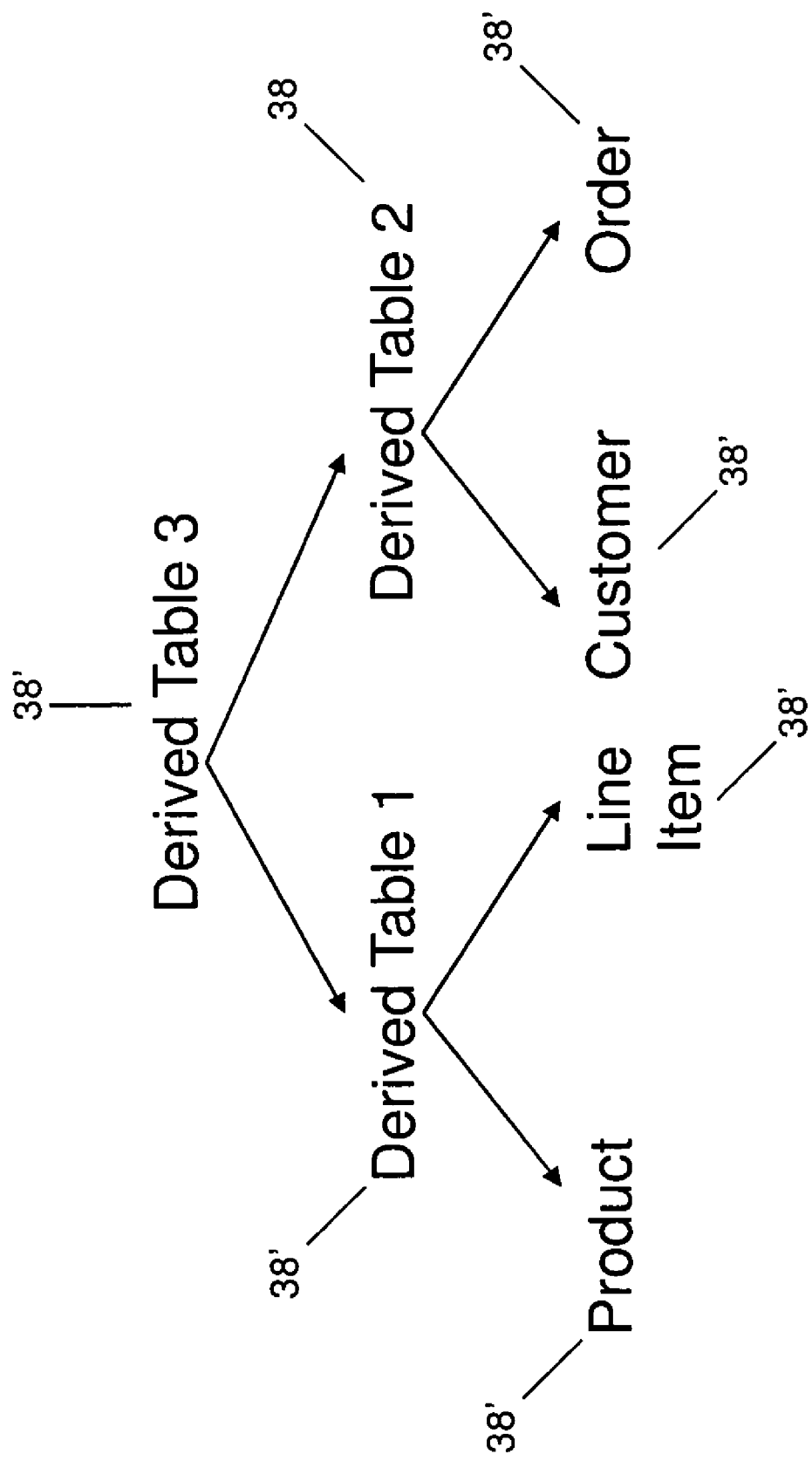
FIG. 17 illustrates a join graph.

A join graph indicates the construction of a derived table 38 in terms of a series of join operations, where the root and intermediate nodes in the graph are derived tablenames 38', and the leaves of the graph are base tablenames 38'. For example, FIG. 17 illustrates a join graph for Derived Table 3, where Derived Table 3 is the root, whose intermediate nodes are Derived Tables 1 and 2, and whose leaf nodes are the base tablenames 38' Product, Line Item. Customer, and Order.

Data Entry Forms and Atomic Transactions

Join graphs can be used to guide modifications to the base tables 38 associated with a modified derived table 38. For example, if a user interface form (containing the data values 42 corresponding to the foreign field data values 60 in the derived table 38) permits data editing (that is, insertion, deletion and update of records 40 relative to a derived table 38), the base tables 38 referenced by the derived table 38 may be updated via data obtained from populating that user interface form. Data entry transactions can be inferred by analyzing the join graph corresponding to the derived table 38, such that either an entire series of data entry actions on base tables 38 (for example, corresponding to entering, updating or deleting a record 40 in a derived table 38) is committed, or none of these data entry actions are committed. Consider the following example of an atomic data entry transaction due to modifying a record 40 in a derived table 38. If a record 40 in Derived Table 3 (see FIG. 16*c*) is modified such that both the Qty and Due Date are changed, then the corresponding modifications to the Order table 38 (to modify the data value 42 in the Due Date field 44 in the appropriate parent record 40) and Line Item table 38 (to modify the data value 42 in the Qty field 44 in the appropriate parent record 40) would comprise a transaction (such that a failure to update either the Order or Line Item tables 38 would result in the failure of the entire update operation). It is straightforward to propagate changes to the derived table's 38 record 40 back to the appropriate base table 38 records 40 by resolving the foreign field data values 60 contained in the derived table 38. Note that any modifications to the (Order and Line Item) base table 38 records 40 would also be visible to Derived Tables 1 and 2, since these derived tables 38 contain foreign field data values 60 referring to parent records 40 in these base tables 38. Thus, inserting, deleting or updating a record 40 in a derived table 38 can drive atomic insertions, deletions or updates to corresponding records 40 in base tables 38.

An advantage of implementing records 40 in derived tables 38 via references (such as offsets) is avoiding replication of the data values 42 in the referenced (parent) records 40. This enables any changes to the data values 42 in the parent records 40 to be immediately accessible to the derived record 40 (without any need to synchronize multiple copies of the data values 42).

Join Algorithm

There are many ways to compute relational joins relative to the two-dimensional data storage model. Below we illustrate one possible join algorithm, which utilizes the previously described query processing mechanism. The key difference in this join algorithm is that instead of containing actual data values 42, the table 38 resulting from the join operation contains references to records 40 (containing actual data values 42) in the various base tables 38 used in the join operation. This also facilitates subsequent transaction processing on these derived tables 38 (as discussed in the previous section on Data Entry Forms and Atomic Transactions).

Assume that 2 tables 38 are to be joined along a series of fields 44 $J_1$ thru $J_N$. As discussed previously, the Foreign Field Map 62 for the table 38 derived from the join can be generated from the Foreign Field Maps 62 of the tables 38 to be joined. (Note that the join fields 44 only need to occur once in the derived table 38.) The following algorithm (see FIG. 18) works best if each table 38 to be joined is sorted for the combination of join fields 44 $J_1$ thru $J_N$ (although such sorting is not essential):

90 Step 1—Iterate Over Unique Combinations of Join Field Data Values: for each unique combination $C_1$ of data values 42 corresponding to the join fields 44 $J_1$ thru $J_N$, perform Steps 2 and 3. (The data values 42 corresponding to any given field 44 can be found simply by collecting the data values 42 contained in the column 50 containing that field 44.)

Example 1: when joining the Product and Line Items tables 38 on the ID field 44 (FIG. 14*a*), the ID field 44 has 3 unique values: "101", "102" and "103".

Example 2: when joining Derived Tables 1 and 2 on the Order # field 44 (see FIGS. 14*a*, 14*c*, 15*a*, 15*c*, 16*a* and 16*c*), the Order # field 44 has 3 distinct values: "1", "2" and "3". (Note that when accessing a record 40 in Derived Tables 1 and 2, the foreign field data values 60 must be converted into their corresponding data values 42 contained in the referenced parent record 40 by utilizing the relevant Foreign Field Maps 62.)

92 Step 2: collect the records 40 in each table 38 to be joined 38 matching $C_1$ (a specific combination of join field data values 42). This can be accomplished by executing the previously mentioned query processing function (discussed in the section on Query Processing) on each table 38 to be joined. The result is a set of "matching records" 40 for each table 38 to be joined. Recall that the query mechanism returns an array 82 of record offsets 84 referring to records 40 in the queried table 38 (as discussed in the section on Query Processing).

Example 1: When joining the Product and Line Item tables 38 (FIG. 14*a*), for ID="101", there is 1 matching record 40 in the Product table 38 (the first record 40) and 2 matching records 40 in the Line Item table 38 (the first and fourth records 40).

Example 2: When joining Derived Tables 1 and 2 (see FIGS. 14*a*, 14*c*, 15*a*, 15*c*, 16*a* and 16*c*), for Order #="1", there are 2 matching records 40 in Derived Table 1 (the first and third records 40) and 1 matching record 40 in Derived Table 2 (the first record 40).

94 Step 3: join the matching records 40 found above in step 2 (via the query execution mechanism) by synthesizing their cross-product, such that each matching record 40 from one table 38 to be joined is combined with each matching record 40 in the other table 38 to be joined. Then add these joined records 40 into the resulting derived table 38. Note that these records 40 already contain the correct foreign field data values 60 namely the record offsets 84 returned by the query execution mechanism that refer to a record 40 in the appropriate base table 38.

Example 1: When joining the Product and Line Item tables 38 (FIG. 14*a*), for ID="101", the cross product of the matching record 40 from the Product table 38 and the 2 matching records 40 in the Line Item table 38 consists of the first two records 40 in FIG. 14*a* (see FIG. 14*c* for the data values 42 corresponding to the foreign field data values 60 in FIG. 14*a*).

Example 2: When joining Derived Tables 1 and 2 (see FIGS. 14*a*, 14*c*, 15*a*, 15*c*, 16*a* and 16*c*), for Order #="1", the cross product of the 2 matching records 40 from Derived Table 1 and the matching record 40 in Derived Table 2 consists of the first and third records 40 in FIG. 16*a* (see FIG. 16*c* for the data values 42 corresponding to the foreign field data values 60 in FIG. 16*a*).

The above discussion refers to "inner joins". In contrast, the result of an "outer join" contains records 40 from one table 38 to be joined that do not match any records 40 in the other table 38 to be joined. This can be useful if matched records 40 are indicative of a successful task (for example, matching payments to invoices), where unmatched records 40 indicate tasks yet to be performed (or goals not yet achieved).

It should be clear that the join algorithm described above is equally applicable to other similar techniques for computing joins.

Join Performance Optimization

If an electronic spreadsheet is used to implement the two-dimensional storage model, then as a performance optimization, data (such as tables 38 to be joined) from the spreadsheet can be "bulk copied" to memory, (for example, this is a very efficient operation in Excel), by specifying the appropriate row 48 and column 50 boundaries in the two-dimensional (spreadsheet) space. This can be especially advantageous during the computation of join operations, which often operate on large amounts of data, since the join operation can proceed by accessing memory (which is more efficient than accessing spreadsheet cells).

Locking

The two-dimensional space (under the diagonal pattern illustrated in FIG. 4) facilitates record-level locking, where the data values 42 corresponding to a specific record 40 (which are horizontally contiguous within the two-dimensional space) can be locked. For example, a specific column 50 in the two-dimensional space (such as the first column 50), can be reserved to contain locking (and other) information about each row 48 (since with the diagonal pattern, there is only 1 record 40 per row 48 in the two-dimensional space). Similarly, the two-dimensional space (diagonal pattern) facilitates field-level locking, where the data values 42 corresponding to a specific field 44 (which are vertically contiguous within the two-dimensional space) can be locked. For example, a specific row 48 in the two-dimensional space (such as the first row 48), can be reserved to contain locking (and other) information about each column 50 (since with the diagonal pattern, there is only 1 field 44 per column 50).

The invention claimed is:

1. A computer-implemented method for implementing a data storage system based on a two-dimensional logical data storage space, implemented via a physical data storage space, containing a plurality of tables, including:

inserting and storing, by means of a computer processor, a table in the plurality of tables into the two-dimensional logical data storage space, representing, by means of the computer processor, the position of the table via a set of two-dimensional coordinates within the two-dimensional logical data storage space, where the two-dimensional logical data storage space contains rows and columns representing records and fields of the table, respectively, where the position of the table is represented so that there is no portion of any other table directly positioned above or below the table, and no portion of any other table directly positioned left or right of the table within the two-dimensional logical data storage space, where the table position is dependent only on the set of two-dimensional coordinates within the two-dimensional logical data storage space, and where contiguity of data values is required in the two-dimensional logical data storage space, but is not required in the physical data storage space, executing, by means of the computer processor, a query comprising a plurality of expressions on the table, where a first expression in the query is applied to the table, resulting in an array of references to a subset of the table's records, where each successive expression in the query is applied to the records referenced by an immediately preceding array, resulting in another array of references to another subset of the table's records, where indexes are not required for efficient data access, and where a final array contains references to a subset of the table's records satisfying the query, deleting, by means of the computer processor, the table from the two-dimensional logical data storage space.

2. The method of claim 1 including:

inserting a record into the table, updating the record in the table, deleting the record from the table, inserting a field into the table,
updating the field in the table, and
deleting the field from the table,
where the records and fields are inserted, updated and deleted without requiring table reconfiguration.

3. The method of claim 2 including:
adjusting the table's position within the two-dimensional logical data storage space when a second table is inserted at a position prior to the table in the two-dimensional logical data storage space,
adjusting the table's position within the two-dimensional logical data storage space when the second table is deleted at the position prior to the table in the two-dimensional logical data storage space,
adjusting the table's position within the two-dimensional logical data storage space when the record is inserted in the second table located at the position prior to the table in the two-dimensional logical data storage space,
adjusting the table's position within the two-dimensional logical data storage space when the record is deleted in the second table located at the position prior to the table in the two-dimensional logical data storage space,
adjusting the table's position within said the two-dimensional logical data storage space when the field is inserted in the second table located at the position prior to the table in the two-dimensional logical data storage space, and
adjusting the table's position within the two-dimensional logical data storage space when the field is deleted in the second table located at the position prior to the table in the two-dimensional logical data storage space.

4. The method of claim 2 where at least one field in the table is a foreign field that references a field in a second table, including:
adjusting a reference contained in the foreign field when a record is inserted in the second table referenced by the foreign field,
adjusting the reference contained in the foreign field when the record is deleted in the second table referenced by the foreign field,
adjusting the reference contained in the foreign field when a field is inserted in the second table referenced by the foreign field, and
adjusting the reference contained in the foreign field when the field is deleted in the second table referenced by the foreign field.

5. The method of claim 2 including:
cascading the insertion of the record, and
cascading the deletion of the record.

6. The method of claim 1 including:
performing a join operation on base tables in the plurality of tables,
where a table to be joined is a table derived from a prior join operation, where the table derived from the prior join operation contains references to data values in the base tables used for constructing the derived table, and where the derived table does not copy any data values contained in the base tables used for constructing the derived table.

7. The method of claim 6:
where the steps for executing the query are used to identify records in the tables to be joined matching a specific combination of join field data values, and
where the matching records are joined together and added to the derived table resulting from the join operation.

8. The method of claim 6 where a spreadsheet is used to implement the two-dimensional logical data storage space, including:
optimizing performance of the join operation by copying data from the spreadsheet to memory.

9. The method of claim 6 including:
editing data in the derived table,
where the base tables used for constructing the derived table are atomically updated using the edited data.

10. The method of claim 1, wherein the two-dimensional logical data storage space further facilitates operations of:
locking a record corresponding to a row in the two-dimensional logical data storage space, and
locking a plurality of field data values corresponding to a column in the two-dimensional logical data storage space.

* * * * *